(12) United States Patent
Nett et al.

(10) Patent No.: US 12,319,775 B2
(45) Date of Patent: Jun. 3, 2025

(54) STERICALLY HINDERED PHOSPHINE-AMIDE SUPPORTED NICKEL (II) OR PALLADIUM (II) CATALYSTS FOR THE COPOLYMERIZATION OF ETHYLENE AND POLAR COMONOMERS

(71) Applicant: Dow Global Technologies LLC, Midland, MI (US)

(72) Inventors: Alex J. Nett, Midland, MI (US); Heather A. Spinney, Midland, MI (US); Todd D. Senecal, Midland, MI (US); David R. Wilson, Midland, MI (US); Robert D J Froese, Midland, MI (US); Alejandro J. Garza Gonzalez, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 435 days.

(21) Appl. No.: 17/907,730

(22) PCT Filed: Mar. 31, 2021

(86) PCT No.: PCT/US2021/025152
§ 371 (c)(1),
(2) Date: Sep. 29, 2022

(87) PCT Pub. No.: WO2021/202714
PCT Pub. Date: Oct. 7, 2021

(65) Prior Publication Data
US 2023/0132484 A1  May 4, 2023

Related U.S. Application Data

(60) Provisional application No. 63/002,760, filed on Mar. 31, 2020.

(51) Int. Cl.
*C08F 4/80* (2006.01)
*B01J 31/18* (2006.01)
*C08F 210/02* (2006.01)

(52) U.S. Cl.
CPC ............ *C08F 4/80* (2013.01); *B01J 31/188* (2013.01); *C08F 210/02* (2013.01)

(58) Field of Classification Search
None
See application file for complete search history.

(56) References Cited

U.S. PATENT DOCUMENTS

| | | | |
|---|---|---|---|
| 8,618,319 B2 | 12/2013 | Shimizu et al. | |
| 2017/0306134 A1 | 10/2017 | Hattori et al. | |
| 2018/0201704 A1 | 7/2018 | Sato et al. | |
| 2019/0262818 A1 | 8/2019 | Chikkali et al. | |

FOREIGN PATENT DOCUMENTS

| CN | 1066320507 B | 5/2017 |
|---|---|---|
| CN | 108017670 A | 5/2018 |
| CN | 109320558 A | 2/2019 |

OTHER PUBLICATIONS

Agostinho, M. et al., "Synthesis and characterization of Co and Ni complexes stabilized by ketoand acetamide-derived P,O-type phosphine ligands". Dalton Transactions 2009, 814-822. (Year: 2009).*
Brazilian Technical Report dated Oct. 14, 2024, pertaining to BR Patent Application No. BR 112022019619-9, 8 pgs.
Chinese Office Action dated Apr. 29, 2024, pertaining to CN Patent Application No. 2021800241415, 6 pgs.
Chinese Office Action dated Jan. 6, 2024, pertaining to CN Patent Application No. 2021800325247, 10 pgs.
Brazil Technical Report dated Sep. 26, 2024, pertaining to BR Patent Application No. BR 11 2022 018724.6, 8 pgs.
Chinese Office Action dated Jul. 12, 2024, pertaining to CN Patent Application No. 2021800325247, 6 pgs.
Communication pursuant to Rules 161(1) and 162 EPC, dated Nov. 11, 2022, pertaining to European Patent Application No. 21720637.4, 3 pages.
Klabunde et al. "Nickel Catalysis for Ethylene Homo- and Co-Polymerization", Journal of Molecular Catalysis, 41 (1987) 123-134.
Kuhl "N-phosphino carboxylic acid amides, lactams and ureas: Synthesis, properties and applications", Coordination Chemistry Reviews 250 (2006) 2867-2915.
International Search Report and Written Opinion dated Jul. 2, 2021, pertaining to Int'l Patent Application No. PCT/US2021/025161, 76 pgs.
Cui et al. "A N-bridged strategy enables hemilabile phosphine-carbonyl palladium and nickel catalysts to mediate ethylene polymerization and copolymerization with polar vinyl monomers", Polym. Chem. 2020, 11, 6187.
International Search Report and Written Opinion dated Jul. 2, 2021, pertaining to Int'l Patent Application No. PCT/US2021/025152, 16 pgs.
Behr et al. "Stoichiometric Insertion of Carbon Dioxide and Ethylene into Nickel-Carbon Bonds", Journal of Organometallic Chemistry, 249 (1983) pp. C38-C40.
Keim et al. "Reactions of Chelate Ylides with Nickel(0) Complexes", Organometallics 1986, 5, pp. 2356-2359.
English et al. "Recombinant and in vitro expression systems for hydrogenases: new frontiers in basic and applied studies for biological and synthetic H2 production", Dalton Trans., 2009, 814-822, abstract only.

(Continued)

*Primary Examiner* — Richard A. Huhn
(74) *Attorney, Agent, or Firm* — Dinsmore & Shohl LLP

(57) ABSTRACT

Processes of polymerizing olefin monomers using catalyst systems and catalysts systems that include a procatalyst having a structure according to formula (I).

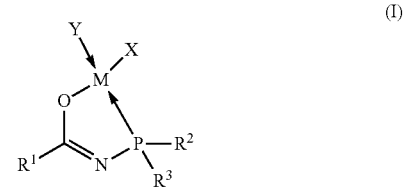

18 Claims, No Drawings

(56) References Cited

OTHER PUBLICATIONS

Meeuwissen et al. "Phosphinoureas: Cooperative Ligands in Rhodium-Catalyzed Hydroformylation? On the Possibility of a Ligand-Assisted Reductive Elimination of the Aldehyde", Organometallics 2010, 29, pp. 2413-2421.
Xin et al. "Nickel Catalyzed Copolymerization of Ethylene and Alkyl Acrylates", J. Am. Chem. Soc. 2017, 139, pp. 3611-3614.
Chinese Office Action dated Sep. 22, 2023, pertaining to CN Patent Application No. 202180024141.5, 12 pgs.
U.S. Notice of Allowance dated Feb. 5, 2025, pertaining to U.S. Appl. No. 17/907,727, 10 pgs.
Baulina, T.V et al., "One-Pot Synthesis of N-Diphenylphosphorlureas", Doklady Chemistry 2006, vol. 409, Part 2, pp. 129-132.
Japanese Office Action dated Mar. 25, 2025, pertaining to JP Patent Application No. 2022-555191, 6 pgs.
Japanese Office Action dated Mar. 25, 2025, pertaining to JP Patent Application No. 2022-555187, 6 pgs.

* cited by examiner

STERICALLY HINDERED PHOSPHINE-AMIDE SUPPORTED NICKEL (II) OR PALLADIUM (II) CATALYSTS FOR THE COPOLYMERIZATION OF ETHYLENE AND POLAR COMONOMERS

CROSS REFERENCE TO RELATED APPLICATIONS

This application is a national stage entry of PCT/US2021/025152 filed on Mar. 31, 2021, which claims priority to U.S. Provisional Patent Application No. 63/002,760 filed on Mar. 31, 2020, the entire disclosures of which are hereby incorporated by reference.

TECHNICAL FIELD

Embodiments of the present disclosure generally relate to ethylene and polar comonomer polymerization catalyst systems and processes, and, more specifically, to ethylene and acrylate polymerization catalyst systems including sterically hindered phosphine-amide supported nickel(II) catalysts, and to olefin polymerization processes incorporating the catalyst systems.

BACKGROUND

Commercially, ethylene/acrylate copolymers are formed through high-pressure and/or high-temperature radical processes and have a highly branched microstructure similar to that of low-density polyethylene (LDPE). Coordination catalysis provides routes to highly linear ethylene/acrylate copolymers with structures similar to that of linear low-density polyethylene (LLDPE). The linear ethylene/acrylate copolymers formed by coordination catalysis exhibit greater crystallinity and higher thermal resistance than those of the copolymers formed through the radical processes.

Common organometallic coordination catalysts appropriate for ethylene polymerization are not compatible with systems including acrylates as comonomers. For example, the Group IV metal catalysts (Ti, Zr, Hf) used in the industrial manufacture of LLDPE (ethylene/α-olefin copolymers) are not compatible with polar olefin monomers, including acrylates. Because the oxygen atoms of acrylates strongly coordinate to Lewis-acidic Group IV metals, during ethylene/acrylate polymerization the active site of the metal becomes blocked by the acrylate and further olefin polymerization is hindered.

Owing to the incompatibility of the Group IV metal catalysts with acrylates, electron-rich metal catalysts containing Group 10 metals (Pd, Ni) have been explored in the copolymerization reactions of ethylene with acrylate monomers. However, many reported Ni- and Pd-containing metal catalysts suffer from (a) slow rates of polymerization and/or (b) low incorporation of the polar monomers of interest.

SUMMARY

Ongoing needs exist to create a ligand framework for Ni and Pd catalysts that promotes both high rates of ethylene copolymerization activity and high incorporation of the acrylate comonomer. With a ligand framework for nickel or palladium, ethylene and polar monomers may be copolymerized via coordination catalysis to form a highly linear, LLDPE-like copolymer. The highly linear copolymers may exhibit improved creep resistance and dimensional stability at higher temperatures, specifically from 80° C. to 150° C., as opposed to temperatures of less than 80° C.

Embodiments of this disclosure include catalyst systems. The catalyst systems include a procatalyst having a structure according to formula (I):

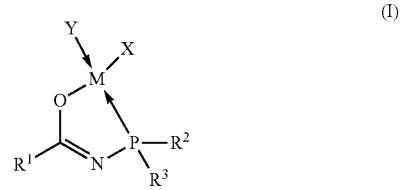

(I)

In formula (I), M is nickel(II) or Pd(II); X is a ligand chosen from $(C_1-C_{40})$hydrocarbyl, $(C_1-C_{40})$heterohydrocarbyl, —H, —CH$_2$Si(R$^C$)$_{3-Q}$(OR$^C$)$_Q$, —Si(R$^C$)$_{3-Q}$(OR$^C$)$_Q$, —OSi(R$^C$)$_{3-Q}$(OR$^C$)$_Q$, —Ge(R$^C$)$_{3-Q}$(OR$^C$)$_Q$, —P(R$^C$)$_{2-W}$(OR$^C$)$_W$, —P(O)(R$^C$)$_{2-W}$(OR$^C$)$_W$, —N(R$^C$)$_2$, —N(Si(R$^C$)$_3$)$_2$, —NR$^C$Si(R$^C$)$_3$, —OR$^C$, —SR$^C$, —NO$_2$, —CN, —CF$_3$, —OCF$_3$, —S(O)R$^C$, —S(O)$_2$R$^C$, —OS(O)$_2$R$^C$, —N=C(R$^C$)$_2$, —N=CH(R$^C$), —N=CH$_2$, —N=P(R$^C$)$_3$, —OC(O)R$^C$, —C(O)OR$^C$, —C(O)R$^C$, —C(O)H, —N(R$^C$)C(O)R$^C$, —N(R$^C$)C(O)H, —NHC(O)R$^C$, —NHC(O)H, —C(O)N(R$^C$)$_2$, —C(O)NHR$^C$, —C(O)NH$_2$, or a halogen. Each R$^C$ in formula (I) is independently (a) a $(C_1-C_{30})$hydrocarbyl optionally substituted with one or more R$^S$; or (b) a $(C_1-C_{30})$heterohydrocarbyl optionally substituted with one or more R$^S$. The subscript Q in the various ligands X is 0, 1, 2, or 3. The subscript W in the various ligands X is 0, 1, or 2. Y is a Lewis base. Optionally, Y and X in formula (I) are covalently connected.

In formula (I), R$^1$ is chosen from unsubstituted $(C_6-C_{40})$aryl, substituted $(C_6-C_{40})$aryl, unsubstituted $(C_1-C_{40})$heteroaryl having its radical on a carbon atom, substituted $(C_1-C_{40})$heteroaryl having its radical on a carbon atom, or substituted $(C_4-C_{20})$alkyl having at least one tertiary carbon atom and having its radical on the tertiary carbon atom.

In formula (I), R$^2$ and R$^3$ are independently selected from radicals having formula (II):

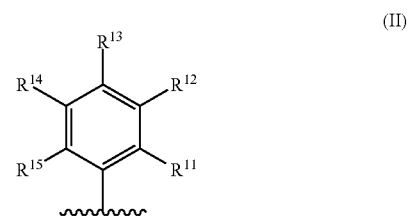

(II)

In formula (II), R$^{11}$, R$^{12}$, R$^{13}$, R$^{14}$, and R$^{15}$ are independently $(C_1-C_{30})$hydrocarbyl, $(C_1-C_{30})$heterohydrocarbyl, —OR$^N$, —NR$^N_2$, —SR$^N$, halogen, or —H, where each R$^N$ is $(C_1-C_{30})$hydrocarbyl, provided that at least one of R$^{11}$ and R$^{15}$ is not —H.

In formula (I), each R$^S$ in formula (I) is independently $(C_1-C_{20})$hydrocarbyl or halogen.

Embodiments of this disclosure include a polymerization process. The polymerization process includes polymerizing ethylene and one or more polar monomers in the presence of a catalyst system under olefin polymerization conditions to form a polar ethylene-based copolymer. The catalyst system includes a metal-ligand complex according to formula (I) of this disclosure.

DETAILED DESCRIPTION

Specific embodiments of catalyst systems will now be described. It should be understood that the catalyst systems of this disclosure may be embodied in different forms and should not be construed as limited to the specific embodiments set forth in this disclosure. Rather, embodiments are provided so that this disclosure will be thorough and complete, and will fully convey the scope of the subject matter to those skilled in the art.

Common abbreviations are listed below:

Me: methyl; Et: ethyl; Ph: phenyl; Bn: benzyl; i-Pr: iso-propyl; t-Bu: tert-butyl; t-Oct: tert-octyl(2,4,4-trimethylpentan-2-yl); THF: tetrahydrofuran; $Et_2O$: diethyl ether; $CH_2Cl_2$: dichloromethane; EtOAc: ethyl acetate; $C_6D_6$: deuterated benzene or benzene-d6: $CDCl_3$: deuterated chloroform; $Na_2SO_4$: sodium sulfate; $MgSO_4$: magnesium sulfate; HCl: hydrogen chloride; n-BuLi: butyllithium; t-BuLi: tert-butyl lithium; $K_2CO_3$: potassium carbonate; $N_2$: nitrogen gas; PhMe: toluene; PPR: parallel pressure reactor; MAO: methylaluminoxane; MMAO: modified methylaluminoxane; GC: gas chromatography; LC: liquid chromatography; NMR: nuclear magnetic resonance; MS mass spectrometry; mmol: millimoles; mL: milliliters; M: molar; min or mins: minutes; h or hrs: hours; d: days; $R_f$: retention factor; TLC; thin-layer chromatography; rpm: revolutions per minute.

The term "independently selected" followed by multiple options is used herein to indicate that individual groups appearing before the term, such as $R^1$, $R^2$, $R^3$, and $R^C$, can be identical or different, without dependency on the identity of any other group also appearing before the term.

The term "procatalyst" refers to a compound that has catalytic activity after activation, for example upon removal of the Lewis base coordinated to the Ni or Pd metal center.

When used to describe certain carbon atom-containing chemical groups, a parenthetical expression having the form "$(C_x-C_y)$" means that the unsubstituted form of the chemical group has from x carbon atoms to y carbon atoms, inclusive of x and y. For example, a $(C_1-C_{50})$alkyl is an alkyl group having from 1 to 50 carbon atoms in its unsubstituted form. In some embodiments and general structures, certain chemical groups may be substituted by one or more substituents such as $R^S$ wherein $R^S$ generically represents any substituent defined in this application. An $R^S$ substituted version of a chemical group defined using the "$(C_x-C_y)$" parenthetical may contain more than y carbon atoms depending on the identity of any groups $R^S$. For example, a "$(C_1-C_{50})$alkyl substituted with exactly one group $R^S$, where $R^S$ is phenyl (—$C_6H_5$)" may contain from 7 to 56 carbon atoms. Thus, in general when a chemical group defined using the "$(C_x-C_y)$" parenthetical is substituted by one or more carbon atom-containing substituents $R^S$, the minimum and maximum total numbers of carbon atoms of the chemical group are determined by adding to both x and y, respectively, the combined sum of the number of carbon atoms from all of the carbon atom-containing substituents $R^S$.

The term "substitution" means that at least one hydrogen atom (—H) bonded to a carbon atom or heteroatom of a corresponding unsubstituted compound or functional group is replaced by a substituent (e.g., $R^S$). The prefix "per" has its usual meaning of "thoroughly." For example, the term "persubstitution" or "persubstituted" means that every hydrogen atom (H) bonded to a carbon atom or heteroatom of a corresponding unsubstituted compound or functional group is replaced by a substituent (e.g., $R^S$). Thus, a "perfluorinated alkyl" is an alkyl group in which every hydrogen atom is replaced by a fluorine atom. The term "polysubstitution" means that at least two, but fewer than all, hydrogen atoms bonded to carbon atoms or heteroatoms of a corresponding unsubstituted compound or functional group are replaced by a substituent. The term "—H" means a hydrogen or hydrogen radical that is covalently bonded to another atom. "Hydrogen" and "—H" are interchangeable, and unless clearly specified have identical meanings.

The term "$(C_1-C_{50})$hydrocarbyl" means a hydrocarbon radical of from 1 to 50 carbon atoms and the term "$(C_1-C_{50})$hydrocarbylene" means a hydrocarbon diradical of from 1 to 50 carbon atoms, in which each hydrocarbon radical and each hydrocarbon diradical is aromatic or non-aromatic, saturated or unsaturated, straight chain or branched chain, cyclic (having three carbons or more, and including mono- and poly-cyclic, fused and non-fused polycyclic, and bicyclic) or acyclic, and substituted by one or more $R^S$ or unsubstituted.

In this disclosure, a $(C_1-C_{50})$hydrocarbyl includes, without limitation, unsubstituted or substituted forms of the following groups: $(C_1-C_{50})$alkyl, $(C_3-C_{50})$cycloalkyl, $(C_3-C_{20})$cycloalkyl-$(C_1-C_{20})$alkylene, $(C_6-C_{40})$aryl, or $(C_6-C_{20})$aryl-$(C_1-C_{20})$alkylene (such as benzyl (—$CH_2$—$C_6H_5$)).

The terms "$(C_1-C_{50})$alkyl" and "$(C_1-C_{18})$alkyl" mean a saturated straight or branched hydrocarbon radical of from 1 to 50 carbon atoms and a saturated straight or branched hydrocarbon radical of from 1 to 18 carbon atoms, respectively, that is unsubstituted or substituted by one or more $R^S$. The radical may be on any one carbon atom of the alkyl. Examples of unsubstituted $(C_1-C_{50})$alkyl are unsubstituted $(C_1-C_{20})$alkyl; unsubstituted $(C_1-C_{10})$alkyl; unsubstituted $(C_1-C_5)$alkyl; methyl; ethyl; 1-propyl; 2-propyl; 1-butyl; 2-butyl; 2-methylpropyl; 1,1-dimethylethyl; 1-pentyl; 2,2-dimethylpropyl; 1-hexyl; 1-heptyl; 1-nonyl; and 1-decyl. Examples of substituted $(C_1-C_{40})$alkyl are substituted $(C_1-C_{20})$alkyl, substituted $(C_1-C_{10})$alkyl, trifluoromethyl, and $[C_n]$alkyl. The term "$[C_n]$alkyl" means the radical, including substituents, contains up to a maximum of n carbon atoms wherein n is an integer from 1 to 45. For example, a $[C_{45}]$alkyl is, for example, a $(C_{27}-C_{40})$alkyl substituted by one $R^S$, which is a $(C_1-C_5)$alkyl, or is, for example a $(C_{15}-C_{25})$alkyl substituted by two $R^S$ groups, which are each a $(C_1-C_{10})$alkyl. Examples of $(C_1-C_5)$alkyl include methyl, ethyl, 1-propyl, 1-methylethyl, 2,2-dimethylpropyl; or 1,1-dimethylethyl. 1,1-Dimethylethyl is a four-carbon alkyl having its radical on the tertiary carbon. The term "tertiary carbon atom" refers to a carbon atom that is covalently bonded to three other carbon atoms.

The term "$(C_6-C_{50})$aryl" means an unsubstituted or substituted (by one or more $R^S$) monocyclic, bicyclic, or tricyclic aromatic hydrocarbon radical of from 6 to 40 carbon atoms, of which at least from 6 to 14 of the carbon atoms are aromatic ring carbon atoms. A monocyclic aromatic hydrocarbon radical includes one aromatic ring; a bicyclic aromatic hydrocarbon radical has two rings; and a tricyclic aromatic hydrocarbon radical has three rings. When the bicyclic or tricyclic aromatic hydrocarbon radical is present, at least one of the rings of the radical is aromatic. The other ring or rings of the aromatic radical may be independently fused or non-fused and aromatic or non-aromatic. Examples of unsubstituted $(C_6-C_{50})$aryl include: unsubstituted $(C_6-C_{20})$aryl, unsubstituted $(C_6-C_{18})$aryl; 2-$(C_1-C_5)$alkyl-phenyl; phenyl; fluorenyl; tetrahydrofluorenyl; indacenyl; hexahydroindacenyl; indenyl; dihydroindenyl; naphthyl; tetrahydronaphtyl; anthracenyl; and phenanthrenyl. Examples of substituted $(C_6-C_{40})$aryl include: substituted $(C_1-C_{20})$aryl; substituted $(C_6-C_{18})$aryl; 2,4-bis([$C_{20}$]alkyl)-phenyl; 3,5-bis([$C_{20}$]alkyl)-phenyl; pentafluorophenyl; and fluoren-9-one-1-yl.

The term "$(C_3-C_{50})$cycloalkyl" means a saturated cyclic hydrocarbon radical of from 3 to 50 carbon atoms that is unsubstituted or substituted by one or more $R^S$. Other cycloalkyl groups (e.g., $(C_x-C_y)$cycloalkyl) are defined in an analogous manner as having from x to y carbon atoms and being either unsubstituted or substituted with one or more $R^S$. Examples of unsubstituted $(C_3-C_{40})$cycloalkyl are unsubstituted $(C_3-C_{20})$cycloalkyl, unsubstituted $(C_3-C_{10})$cycloalkyl, cyclopropyl, cyclobutyl, cyclopentyl, cyclohexyl, cycloheptyl, cyclooctyl, cyclononyl, and cyclodecyl. Examples of substituted $(C_3-C_{40})$cycloalkyl are substituted $(C_3-C_{20})$cycloalkyl, substituted $(C_3-C_{10})$cycloalkyl, cyclopentanon-2-yl, and 1-fluorocyclohexyl.

Examples of $(C_1-C_{50})$hydrocarbylene include, without limitation, unsubstituted or substituted forms of groups such as $(C_6-C_{50})$arylene, $(C_3-C_{50})$cycloalkylene, and $(C_1-C_{50})$alkylene (e.g., $(C_1-C_{20})$alkylene). The diradicals may be on the same carbon atom (e.g., —$CH_2$—) or on adjacent carbon atoms (i.e., 1,2-diradicals), or are spaced apart by one, two, or more than two intervening carbon atoms (e.g., 1,3-diradicals, 1,4-diradicals, etc.). Some diradicals include 1,2-, 1,3-, 1,4-, or an α,ω-diradical, and others a 1,2-diradical. The α,ω-diradical is a diradical that has maximum carbon backbone spacing between the radical carbons. Some examples of $(C_2-C_{20})$alkylene α,ω-diradicals include ethan-1,2-diyl (i.e., —$CH_2CH_2$—), propan-1,3-diyl (i.e., —$CH_2CH_2CH_2$—), 2-methylpropan-1,3-diyl (i.e., —$CH_2CH(CH_3)CH_2$—). Some examples of $(C_6-C_{50})$arylene α,ω-diradicals include phenyl-1,4-diyl, naphthalen-2,6-diyl, or naphthalen-3,7-diyl.

The term "$(C_1-C_{50})$alkylene" means a saturated straight chain or branched chain diradical (i.e., the radicals are not on ring atoms) of from 1 to 50 carbon atoms that is unsubstituted or substituted by one or more $R^S$. Examples of unsubstituted $(C_1-C_{50})$alkylene are unsubstituted $(C_1-C_{20})$alkylene, including unsubstituted —$CH_2CH_2$—, —$(CH_2)_3$—, —$(CH_2)_4$—, —$(CH_2)_5$—, —$(CH_2)_6$—, —$(CH_2)_7$—, —$(CH_2)_8$—, —$CH_2C^*HCH_3$, and —$(CH_2)_4C^*(H)(CH_3)$, in which "C*" denotes a carbon atom from which a hydrogen atom is removed to form a secondary or tertiary alkyl radical. Examples of substituted $(C_1-C_{50})$alkylene are substituted $(C_1-C_{20})$alkylene, —$CF_2$—, —C(O)—, and —$(CH_2)_{14}C(CH_3)_2(CH_2)_5$— (i.e., a 6,6-dimethyl substituted 1,20-eicosylene). Examples of substituted $(C_1-C_{50})$alkylene also include 1,2-cyclopentanediylbis(methylene), 1,2-cyclohexanediylbis(methylene), 7,7-dimethyl-bicyclo[2.2.1]heptane-2,3-diylbis(methylene), and bicyclo[2.2.2]octane-2,3-diylbis(methylene).

The term "$(C_3-C_{50})$cycloalkylene" means a cyclic diradical (i.e., the radicals are on ring atoms) of from 3 to 50 carbon atoms that is unsubstituted or substituted by one or more $R^S$.

The term "heteroatom," refers to an atom other than hydrogen or carbon. Examples of groups containing one or more than one heteroatom include —O—, —S—, —S(O)—, —S(O)$_2$—, —Si($R^C$)$_2$—, —P($R^P$)—, —P($R^P$)$_2$, —P(O)($R^P$)$_2$, —N($R^N$)—, —N($R^N$)$_2$, —N=C($R^C$)$_2$, —N=C(N$R^N_2$)($R^C$), —Ge($R^C$)$_2$—, or —Si($R^C$)$_3$, where each $R^C$ and each $R^P$ is unsubstituted $(C_1-C_{18})$hydrocarbyl or —H, and where each R is unsubstituted $(C_1-C_{18})$hydrocarbyl or —H. The term "heterohydrocarbon" refers to a molecule or molecular framework in which one or more carbon atoms of a hydrocarbon are replaced with a heteroatom. The term "$(C_1-C_{50})$heterohydrocarbyl" means a heterohydrocarbon radical of from 1 to 50 carbon atoms, and the term "$(C_1-C_{50})$heterohydrocarbylene" means a heterohydrocarbon diradical of from 1 to 50 carbon atoms. The heterohydrocarbon of the $(C_1-C_{50})$heterohydrocarbyl or the $(C_1-C_{50})$heterohydrocarbylene has one or more heteroatoms. The radical of the heterohydrocarbyl may be on a carbon atom or a heteroatom. The two radicals of the heterohydrocarbylene may be on a single carbon atom or on a single heteroatom. Additionally, one of the two radicals of the diradical may be on a carbon atom and the other radical may be on a different carbon atom; one of the two radicals may be on a carbon atom and the other on a heteroatom; or one of the two radicals may be on a heteroatom and the other radical on a different heteroatom. Each $(C_1-C_{50})$heterohydrocarbyl and $(C_1-C_{50})$heterohydrocarbylene may be unsubstituted or substituted (by one or more $R^S$), aromatic or non-aromatic, saturated or unsaturated, straight chain or branched chain, cyclic (including mono- and poly-cyclic, fused and non-fused polycyclic), or acyclic.

The $(C_1-C_{50})$heterohydrocarbyl may be unsubstituted or substituted. Non-limiting examples of the $(C_1-C_{50})$heterohydrocarbyl include $(C_1-C_{50})$heteroalkyl, $(C_1-C_{50})$hydrocarbyl-O—, $(C_1-C_{50})$hydrocarbyl-S—, $(C_1-C_{50})$hydrocarbyl-S(O)—, $(C_1-C_{50})$hydrocarbyl-S(O)$_2$—, $(C_1-C_{50})$hydrocarbyl-Si($R^C$)$_2$—, $(C_1-C_{50})$hydrocarbyl-N($R^N$)—, $(C_1-C_{50})$hydrocarbyl-P($R^P$)—, $(C_2-C_{50})$heterocycloalkyl, $(C_2-C_{19})$heterocycloalkyl-$(C_1-C_{20})$alkylene, $(C_3-C_{20})$cycloalkyl-$(C_1-C_{19})$heteroalkylene, $(C_2-C_{19})$heterocycloalkyl-$(C_1-C_{20})$heteroalkylene, $(C_1-C_{50})$heteroaryl, $(C_1-C_{19})$heteroaryl-$(C_1-C_{20})$alkylene, $(C_6-C_{20})$aryl-$(C_1-C_{19})$heteroalkylene, or $(C_1-C_{19})$heteroaryl-$(C_1-C_{20})$heteroalkylene. Additional examples include, but are not limited to —Si($R^C$)$_{3-Q}$(O$R^C$)$_Q$, —OSi($R^C$)$_{3-Q}$(O$R^C$)$_Q$, —Ge($R^C$)$_{3-Q}$(O$R^C$)$_Q$, —P($R^C$)$_{2-W}$(O$R^C$)$_W$, —P(O)($R^C$)$_{2-W}$(O$R^C$)$_W$, —N($R^C$)$_2$, —NH($R^C$)$_2$, O$R^C$S$R^C$—N$_{O2}$, —CN, —CF$_3$, —OCF$_3$, —S(O)$R^C$, —S(O)$_2R^C$, —OS(O)$_2R^C$, —N=C($R^C$)$_2$, —N=P($R^C$)$_3$, —OC(O)$R^C$, —C(O)$R^C$, —C(O)O$R^C$, —N($R^C$)C(O)O$R^C$, and —C(O)N($R^C$)$_2$.

The term "$(C_4-C_{50})$heteroaryl" means an unsubstituted or substituted (by one or more $R^S$) monocyclic, bicyclic, or tricyclic heteroaromatic hydrocarbon radical of from 2 to 50 total carbon atoms and from 1 to 10 heteroatoms. The radical of the heteroaryl may be on a carbon atom or a heteroatom. A monocyclic heteroaromatic hydrocarbon radical includes one heteroaromatic ring; a bicyclic heteroaromatic hydrocarbon radical has two rings; and a tricyclic heteroaromatic hydrocarbon radical has three rings. When the bicyclic or tricyclic heteroaromatic hydrocarbon radical is present, at least one of the rings in the radical is heteroaromatic. The other ring or rings of the heteroaromatic radical may be independently fused or non-fused and aromatic or non-aromatic. Other heteroaryl groups (e.g., $(C_x-C_y)$heteroaryl generally, such as $(C_4-C_{12})$heteroaryl) are defined in an analogous manner as having from x to y carbon atoms (such as 4 to 12 carbon atoms) and being unsubstituted or substituted by one or more than one $R^S$. The monocyclic heteroaromatic hydrocarbon radical is a 5-membered ring or a 6-membered ring. The 5-membered ring has 5 minus h carbon atoms, wherein h is the number of heteroatoms and may be 1, 2, 3, or 4; and each heteroatom independently may be O, S, N, or P. Examples of 5-membered ring heteroaromatic hydrocarbon radicals include pyrrol-1-yl; pyrrol-2-yl;

furan-3-yl; thiophen-2-yl; pyrazol-1-yl; isoxazol-2-yl; isothiazol-5-yl; imidazol-2-yl; oxazol-4-yl; thiazol-2-yl; 1,2,4-triazol-1-yl; 1,3,4-oxadiazol-2-yl; 1,3,4-thiadiazol-2-yl; tetrazol-1-yl; tetrazol-2-yl; and tetrazol-5-yl. The 6-membered ring has 6 minus h carbon atoms, wherein h is the number of heteroatoms and may be 1, 2 or 3 and the heteroatoms may be N or P. Examples of 6-membered ring heteroaromatic hydrocarbon radicals include pyridine-2-yl; pyrimidin-2-yl; pyrazin-2-yl; 1,3,5-triazin-2-yl. The bicyclic heteroaromatic hydrocarbon radical can be a fused 5,6- or 6,6-ring system. Examples of the fused 5,6-ring system bicyclic heteroaromatic hydrocarbon radical are indol-1-yl; and benzimidazol-1-yl. Examples of the fused 6,6-ring system bicyclic heteroaromatic hydrocarbon radical are quinolin-2-yl; and isoquinolin-1-yl. The tricyclic heteroaromatic hydrocarbon radical can be a fused 5,6,5-; 5,6,6-; 6,5,6-; or 6,6,6-ring system. An example of the fused 5,6,5-ring system is 1,7-dihydropyrrolo[3,2-f]indol-1-yl. An example of the fused 5,6,6-ring system is 1H-benzo[f] indol-1-yl. An example of the fused 6,5,6-ring system is 9H-carbazol-9-yl. An example of the fused 6,6,6-ring system is acrydin-9-yl.

The term "$(C_1-C_{50})$heteroalkyl" means a saturated straight or branched chain radical containing 1 to 50 carbon atoms, and one or more than one heteroatom. The term "$(C_1-C_{50})$heteroalkylene" means a saturated straight or branched chain diradical containing from 1 to 50 carbon atoms and one or more than one heteroatom. The heteroatoms of the heteroalkyls or the heteroalkylenes may include, but are not limited to $Si(R^C)_3$, $Ge(R^C)_3$, $Si(R^C)_2$, $Ge(R^C)_2$, $P(R^P)_2$, $P(R^P)$, $P(O)(R^P)_2$, $N(R^N)_2$, $N(R^N)$, N, O, $OR^C$, S, $SR^C$, $S(O)$, and $S(O)_2$, wherein each of the heteroalkyl and heteroalkylene groups are unsubstituted or are substituted by one or more $R^S$.

Examples of unsubstituted $(C_2-C_{40})$heterocycloalkyl include unsubstituted $(C_2-C_{20})$heterocycloalkyl, unsubstituted $(C_2-C_{10})$heterocycloalkyl, aziridin-1-yl, oxetan-2-yl, tetrahydrofuran-3-yl, pyrrolidin-1-yl, tetrahydrothiophen-S, S-dioxide-2-yl, morpholin-4-yl, 1,4-dioxan-2-yl, hexahydroazepin-4-yl, 3-oxa-cyclooctyl, 5-thio-cyclononyl, and 2-aza-cyclodecyl.

The term "halogen atom" or "halogen" means the radical of a fluorine atom (F), chlorine atom (Cl), bromine atom (Br), or iodine atom (I). The term "halide" means the anionic form of the halogen atom: fluoride ($F^-$), chloride ($Cl^-$), bromide ($Br^-$), or iodide ($I^-$).

The term "saturated" means lacking carbon-carbon double bonds, carbon-carbon triple bonds, and (in heteroatom-containing groups) carbon-nitrogen, carbon-phosphorus, nitrogen-nitrogen, nitrogen-phosphorus, and carbon-silicon double or triple bonds. Where a saturated chemical group is substituted by one or more substituents $R^S$, one or more double and/or triple bonds optionally may or may not be present in substituents $R^S$. The term "unsaturated" means containing one or more carbon-carbon double bonds, carbon-carbon triple bonds, or (in heteroatom-containing groups) one or more carbon-nitrogen, carbon-phosphorus, nitrogen-nitrogen, nitrogen-phosphorus, or carbon-silicon double or triple bonds, not including double bonds that may be present in substituents $R^S$, if any, or in (hetero) aromatic rings, if any.

Embodiments of this disclosure include catalyst systems. The catalyst system includes a procatalyst having a structure according to formula (I):

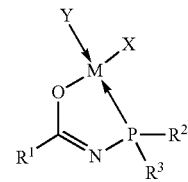

(I)

In formula (I), M is nickel(II) or Pd (II); X is a ligand chosen from $(C_1-C_{40})$hydrocarbyl, $(C_1-C_{40})$heterohydrocarbyl, —H, —$CH_2Si(R^C)_{3-Q}(OR^C)_Q$, —$Si(R^C)_{3-Q}(OR^C)_Q$, —$OSi(R^C)_{3-Q}(OR^C)_Q$, —$Ge(R^C)_{3-Q}(OR^C)_Q$, —$P(R^C)_{2-W}(OR^C)_W$, —$P(O)(R^C)_{2-W}(OR^C)_W$, —$N(R^C)_2$, —$N(Si(R^C)_3)_2$, —$NR^CSi(R^C)_3$, —$OR^CSR^C$, —$NO_2$, —CN, —$CF_3$, —$OCF_3$, —$S(O)R^C$, —$S(O)_2R^C$, —$OS(O)_2R^C$, —N=C($R^C)_2$, —N=CH($R^C$), —N=$CH_2$, —N=$P(R^C)_3$, —OC(O)$R^C$, —C(O)O$R^C$, —C(O)$R^C$, —N($R^C$)C(O)$R^C$, —N($R^C$)C(O)H, —NHC(O)$R^C$, —NHC(O)H, —C(O)N($R^C)_2$, —C(O)NH$R^C$, —C(O)NH$_2$, or a halogen. The subscript Q in the various ligands X is 0, 1, 2, or 3. The subscript W in the various ligands X is 0, 1, or 2. Y is a Lewis base. Optionally, Y and X in formula (I) are covalently connected.

In formula (I), $R^1$ is chosen from unsubstituted $(C_6-C_{40})$ aryl, substituted $(C_6-C_{40})$aryl, unsubstituted $(C_1-C_{40})$heteroaryl having its radical on a carbon atom, substituted $(C_1-C_{40})$heteroaryl having its radical on a carbon atom, or substituted $(C_4-C_{20})$alkyl having at least one tertiary carbon atom and having its radical on the tertiary carbon atom. The term "tertiary carbon atom" refers to a carbon atom that is covalently bonded to three other carbon atoms.

In formula (I), $R^2$ and $R^3$ are independently selected from radicals having formula (II):

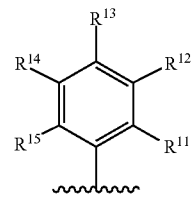

(II)

In formula (II), $R^{11}$, $R^{12}$, $R^{13}$, $R^{14}$, and $R^{15}$ are independently $(C_1-C_{30})$hydrocarbyl, $(C_1-C_{30})$heterohydrocarbyl, —$OR^N$, —$NR^N_2$, —$SR^N$, halogen, or —H; provided that at least one or $R^{11}$ and $R^{15}$ is not —H. Each $R^N$ is $(C_1-C_{30})$ hydrocarbyl.

In formula (I), each $R^C$ in formula (I) is independently (a) a $(C_1-C_{30})$hydrocarbyl optionally substituted with one or more $R^S$; or (b) a $(C_1-C_{30})$heterohydrocarbyl optionally substituted with one or more $R^S$. Each $R^S$ in formula (I) is independently $(C_1-C_{20})$hydrocarbyl or halogen.

In one or more embodiments, in formula (I), $R^2$ and $R^3$ are identical.

In various embodiments, in formula (I), $R^{11}$ and $R^{15}$ are independently —O[$(C_1-C_{10})$alkyl]. In some embodiments, $R^{11}$ and $R^{15}$ are methoxy, ethoxy or isopropoxy, preferably methoxy or ethoxy. In other embodiments, $R^{11}$ and $R^{15}$ are independently —N[$(C_1-C_{10})$alkyl]$_2$.

In one or more embodiments, $R^1$ is a radical having formula (III):

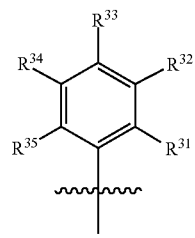

In formula (III), each of $R^{31-35}$ is independently chosen from —H, $(C_1-C_{40})$hydrocarbyl, $(C_1-C_{40})$heterohydrocarbyl, —Si$(R^R)_3$, —Ge$(R^R)_3$, —P$(R^R)_2$, —P(O)$(R^R)_2$, —N$(R^R)_2$, —OR$^R$, —SR$^R$, —NO$_2$, —CN, —CF$_3$, or halogen, where each $R^R$ is $(C_1-C_{30})$hydrocarbyl, $(C_1-C_{30})$heterohydrocarbyl, halogen, or —H. In some embodiments, $R^{32}$, $R^{33}$, and $R^{34}$ are independently chosen from $(C_1-C_{40})$heterohydrocarbyl, —Si[$(C_1-C_{10})$alkyl]$_3$, —N[$(C_1-C_{10})$alkyl]$_2$, —O[$(C_1-C_{10})$alkyl]. In one or more embodiments, $R^{32}$, $R^{33}$, and $R^{34}$ are independently chosen from methoxy or ethoxy. In some embodiments, $R^1$ is 2-furyl.

In some embodiments, in formula (III), $R^{32}$ and $R^{34}$ are —CF$_3$.

In the metal-ligand complex according to formula (I), each Y bonds with M through a dative bond or an ionic bond. In one or more embodiments, Y is a Lewis base. The Lewis base may be a compound or an ionic species, which can donate an electron pair to an acceptor moiety. For purposes of this description, the acceptor moiety is M, the metal of the metal-ligand complex of formula (I). In some embodiments, the Lewis base may be a heterohydrocarbon or a hydrocarbon. Examples of neutral heterohydrocarbon Lewis bases include, but are not limited to, amines, trialkylamines, ethers, cycloethers, or sulfides. Examples of neutral hydrocarbon Lewis bases include, but are not limited to, alkenes, alkynes, or arenes.

In one or more embodiments, Y is a neutral Lewis basic aprotic $(C_2-C_{40})$heterohydrocarbon. Aprotic $(C_2-C_{40})$heterohydrocarbons are $(C_2-C_{40})$heterohydrocarbons as previously defined, for which every hydrogen atom of the $(C_2-C_{40})$heterohydrocarbon has a pKa of greater than 30 wherein pKa is the negative base-10 logarithm of the acid dissociation constant (Ka). In some embodiments, Y is an organic Lewis base. Examples of organic Lewis bases include pyridine, or a substituted pyridine, a sulfoxide, a trialkyl or triaryl phosphine, a trialkyl or triaryl phosphine oxide, an olefin or cyclic olefin, a substituted or unsubstituted heterocycle, an alkyl ester of an aliphatic or aromatic carboxylic acid, an aliphatic ketone, an aliphatic amine, an alkyl or cycloalkyl ether, or mixtures thereof, each electron donor having 2 to 20 carbon atoms. In various embodiments, the organic Lewis base is selected from alkyl and cycloalkyl ethers having 2 to 20 carbon atoms; and dialkyl, diaryl, and alkylaryl ketones having 3 to 20 carbon atoms; and alkyl esters having 2 to 20 carbon atoms. Specific examples of an organic Lewis base include, but are not limited to: methyl formate, ethyl acetate, butyl acetate, ethyl ether, dioxane, di-n-propyl ether, dibutyl ether, ethyl formate, dimethylformamide, methyl acetate, ethyl anisate, ethylene carbonate, tetrahydropyran, tetrahydrofuran, ethyl propionate, lutidine, picoline, pyridine, dimethyl sulfoxide, trimethylphosphine, triethylphosphine, triphenylphosphine, cyclooctadiene, cyclopentene, ethylene, propylene, tert-butyl ethylene, trimethylamine, triethylamine, tributylamine, N,N-dimethylaniline, 1-methylimidazole, or 1-methylpyrazole.

In one or more embodiments, the Lewis base may be a monodentate ligand that may be a neutral ligand. In some embodiments, the neutral ligand may contain a heteroatom. In specific embodiments, the neutral ligand is a neutral group such as $R^T NR^K R^L$, $R^K OR^L$, $R^K SR^L$, or $R^T PR^K R^L$, where each $R^T$ independently is [$(C_1-C_{10})$hydrocarbyl]$_3$Si$(C_1-C_{10})$hydrocarbylene, $(C_1-C_{40})$hydrocarbyl, [$(C_1-C_{10})$hydrocarbyl]$_3$Si, or $(C_1-C_{40})$heterohydrocarbyl and each $R^K$ and $R^L$ independently is hydrogen, $(C_1-C_{40})$hydrocarbyl, or $(C_1-C_{40})$heterohydrocarbyl.

In some embodiments, the Lewis base is $(C_1-C_{20})$hydrocarbon. In some embodiments, the Lewis base is cyclopentadiene, 1,3-butadiene or cyclooctene.

In various embodiments, the Lewis base is a $(C_1-C_{20})$heterohydrocarbon, wherein the heteroatom of the heterohydrocarbon is oxygen. In some embodiments, Y is tetrahydrofuran, pyrene, dioxane, diethyl ether, or methyl tert-butyl ether (MTBE).

In various embodiments, the Lewis base is a $(C_1-C_{20})$heterohydrocarbon, wherein the heteroatom of the heterohydrocarbon is nitrogen. In some embodiments, Y is pyridine, picoline, lutidine, trimethylamine, or triethylamine.

In various embodiments, the Lewis base is a $(C_1-C_{20})$heterohydrocarbon, wherein the heteroatom of the heterohydrocarbon is phosphorus. In some embodiments, Y is trimethylphosphine, triethylphosphine, triphenylphosphine, triethylphosphite, trimethylphosphite, triphenylphosphite, or triphenylphosphine oxide.

In some embodiments, X and Y are covalently linked. Specific examples of an organic Lewis base Y covalently linked together with an X group include, but are not limited to: 4-cycloocten-1-yl, 2-dimethylaminobenzyl, and 2-dimethylaminomethylphenyl.

In some embodiments, X and Y are linked and selected from the group consisting of:

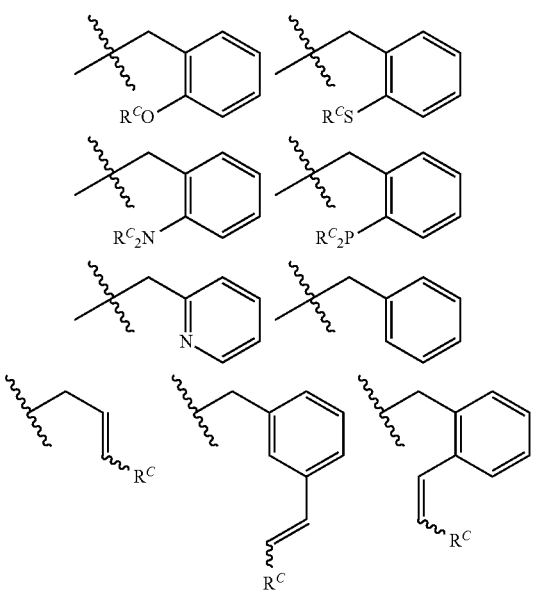

-continued

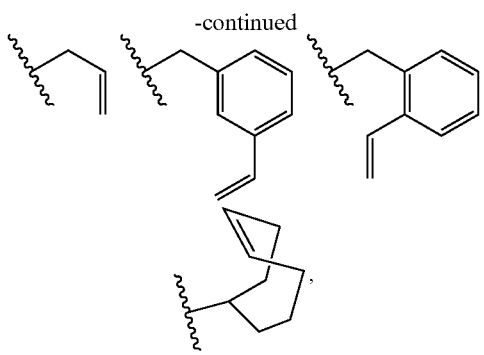

where $R^C$ is —H or $(C_1-C_{30})$hydrocarbyl, $(C_1-C_{30})$heterohydrocarbyl, $(C_1-C_{20})$alkyl, or $(C_1-C_{12})$alkyl.

In the metal-ligand complex according to formula (I), X bonds with M through a covalent bond or an ionic bond. In some embodiments, X may be a monoanionic ligand having a net formal oxidation state of −1. Each monoanionic ligand may independently be hydride, $(C_1-C_{40})$hydrocarbyl carbanion, $(C_1-C_{40})$heterohydrocarbyl carbanion, halide, nitrate, hydrogencarbonate, dihydrogenphosphate, hydrogensulfate, HC(O)O⁻, HC(O)N(H)⁻, $(C_1-C_{40})$hydrocarbylC(O)O⁻, $(C_1-C_{40})$hydrocarbylC(O)N$((C_1-C_{20})$hydrocarbyl$)^-$, $(C_1-C_{40})$hydrocarbylC(O)N(H)⁻, $R^K R^L B^-$, $R^K R^L N^-$, $R^K O^-$, $R^K S^-$, $R^K R^L P^-$, or $R^M R^K R^L Si^-$, where each $R^K$, $R^L$, and $R^M$ independently is hydrogen, $(C_1-C_{40})$hydrocarbyl, or $(C_1-C_{40})$heterohydrocarbyl, or $R^K$ and $R^L$ are taken together to form a $(C_2-C_{40})$hydrocarbylene or $(C_1-C_{20})$heterohydrocarbylene and $R^M$ is as defined above.

In some embodiments, X is a halogen, $(C_1-C_{20})$hydrocarbyl, $(C_1-C_{20})$heterohydrocarbyl, $(C_1-C_{20})$hydrocarbylC(O)O—, or $R^K R^L N$—, wherein each of $R^K$ and $R^L$ independently is an $(C_1-C_{20})$hydrocarbyl. In some embodiments, each monodentate ligand X is a chlorine atom, $(C_1-C_{10})$hydrocarbyl (e.g., $(C_1-C_6)$alkyl or benzyl), unsubstituted $(C_1-C_{10})$hydrocarbylC(O)O—, or $R^K R^L N$—, wherein each of $R^K$ and $R^L$ independently is an unsubstituted $(C_1-C_{10})$hydrocarbyl.

In further embodiments, X is selected from methyl; ethyl; 1-propyl; 2-propyl; 1-butyl; 2,2,-dimethylpropyl; trimethylsilylmethyl; dimethylphenylsilylmethyl; methyldiphenylsilylmethyl; triphenylsilylmethyl; benzyldimethylsilylmethyl; trimethylsilylmethyldimethylsilylmethyl; phenyl; benzyl; or chloro.

In one or more embodiments, X is —(CH$_2$)SiR$^X_3$, in which each $R^X$ is independently a $(C_1-C_{30})$alkyl or a $(C_1-C_{30})$heteroalkyl and at least one $R^X$ is $(C_1-C_{30})$alkyl. In some embodiments, when one of $R^X$ is a $(C_1-C_{30})$heteroalkyl, the heteroatom is a silicon or oxygen atom. In some embodiments, $R^X$ is methyl, ethyl, propyl, 2-propyl, butyl, 1,1-dimethylethyl (or tert-butyl), pentyl, hexyl, heptyl, n-octyl, tert-octyl, or nonyl.

In one or more embodiments X is —(CH$_2$)Si(CH$_3$)$_3$, —(CH$_2$)Si(CH$_3$)$_2$(C$_6$H$_5$), —(CH$_2$)Si(CH$_3$)(C$_6$H$_5$)$_2$, —(CH$_2$)Si(C$_6$H$_5$)$_3$, —(CH$_2$)Si(CH$_3$)$_2$(CH$_2$C$_6$H$_5$), —(CH$_2$)Si(CH$_3$)$_2$(CH$_2$CH$_3$); —(CH$_2$)Si(CH$_3$)(CH$_2$CH$_3$)$_2$, —(CH$_2$)Si(CH$_2$CH$_3$)$_3$, —(CH$_2$)Si(CH$_3$)$_2$(n-butyl), —(CH$_2$)Si(CH$_3$)$_2$(n-hexyl), —(CH$_2$)Si(CH$_3$)(n-oct)R$^X$, —(CH$_2$)Si(CH$_3$)$_2$R$^X$, —(CH$_2$)Si(n-oct)R$^X_2$, —(CH$_2$)Si(CH$_3$)$_2$(2-ethylhexyl), —(CH$_2$)Si(CH$_3$)$_2$(dodecyl), or —CH$_2$Si(CH$_3$)$_2$CH$_2$Si(CH$_3$)$_3$ (herein referred to as —CH$_2$Si(CH$_3$)$_2$CH$_2$TMS). Optionally, in some embodiments, in the metal-ligand complex according to formula (I), exactly two $R^X$ are covalently linked or exactly three $R^X$ are covalently linked.

In some embodiments, X is —CH$_2$Si(R$^C$)$_{3-Q}$(OR$^C$)$_Q$, —Si(R$^C$)$_{3-Q}$(OR$^C$)$_Q$, —OSi(R$^C$)$_{3-Q}$(OR$^C$)$_Q$, in which subscript Q is 0, 1, 2 or 3 and each $R^C$ is independently a substituted or unsubstituted $(C_1-C_{30})$hydrocarbyl, or a substituted or unsubstituted $(C_1-C_{30})$heterohydrocarbyl. In some embodiments, X is —CH$_2$Si(CH$_3$)$_3$.

In some embodiments, any or all of the chemical groups of the procatalysts of formula (I) may be unsubstituted, except for either $R^{11}$ or $R^{15}$. At least one of $R^{11}$ and $R^{15}$ is substituted. In other embodiments, none, any, or all of the chemical groups X and $R^1$-$R^4$, $R^{11-15}$ or $R^{31-35}$ of the metal-ligand complex of formula (I) may be substituted with one or more than one $R^S$. When two or more than two $R^S$ are bonded to a same chemical group of the procatalysts of formula (I), the individual $R^S$ of the chemical group may be bonded to the same carbon atom or heteroatom or to different carbon atoms or heteroatoms. In some embodiments, none, any, or all of the chemical groups X and $R^1$-$R^4$, $R^{11-15}$, or $R^{31-35}$ may be persubstituted with $R^S$. In the chemical groups that are persubstituted with $R^S$, the individual $R^S$ may all be the same or may be independently chosen.

Embodiments of this disclosure include polymerization processes. In some embodiments, the polymerization process includes polymerizing ethylene with one or more olefinic monomers in the presence of a catalyst system under olefin polymerization conditions to form an ethylene-based copolymer. The catalyst system includes a metal-ligand complex according to formula (I) as described in this disclosure.

In some embodiments, the polymerization processes include polymerizing ethylene, one or more polar monomers, and optionally, one or more α-olefin monomers in the presence of a catalyst system under olefin polymerization conditions to form an ethylene/polar monomer copolymer. The catalyst system includes a procatalyst according to formula (I) of this disclosure. In one or more embodiments, the polymerization processes include polymerizing ethylene, one or more alkyl acrylate monomers, and optionally, one or more α-olefin monomers in the presence of a catalyst system under olefin polymerization conditions to form an ethylene/alkyl acrylate copolymer, the catalyst system comprising a procatalyst according to formula (I) of this disclosure.

In some embodiments of the polymerization process, the polymerization process comprises polymerizing ethylene and optionally one or more $(C_3-C_{10})$α-olefin monomers or cyclic olefin monomers in the presence of a catalyst system under olefin polymerization conditions to form an ethylene-based copolymer, the catalyst system comprising a metal-ligand complex procatalyst having a structure according to formula (I) as described in this disclosure.

In some embodiments of the polymerization process, the polymerization process comprises polymerizing ethylene, a polar comonomer, and optionally one or more $(C_3-C_{10})$α-olefin monomers or cyclic olefin monomers in the presence of a catalyst system under olefin polymerization conditions to form an ethylene-based copolymer, the catalyst system comprising a metal-ligand complex procatalyst having a structure according to formula (I) as described in this disclosure.

Olefinic monomers may include, but are not limited to, propylene, 1-butene, 1-hexene, 1-octene, 1-nonene, 1-decene, 1-undecene, 1-dodecene, 4-methyl-1-pentene, styrene, cyclobutene, cyclopentene, norbornene, ethylidene norbornene, alkyl acrylate, glycidyl acrylate, vinyl acetate, CH$_2$=C(H)C(O)(OR$^X$), CH$_2$=CHC(O)R$^X$, CH$_2$=CH ($OR^X$), $CH_2=CH(CH_2)(OR^X)$, $CH_2=CHSi(R^X)_{3-Y}(OR^X)_Y$, $CH_2=CH-OSi(R^X)_{3-Y}(OR^X)_Y$, or $CH_2=CHCl$, where $R^X$ is chosen from —H, a substituted or unsubstituted ($C_1$-$C_{30}$) hydrocarbyl, or a substituted or unsubstituted ($C_1$-$C_{30}$)heterohydrocarbyl, and subscript Y is 0, 1, 2, or 3.

In various embodiments of the polymerization processes, the polar comonomer includes alkyl acrylates $CH_2=CHC(O)(OR)$, glycidyl acrylate, $CH_2=CH(CH_2)_nC(O)(OR)$, $CH_2=CHC(O)R$, $CH_2=CH(CH_2)_nC(O)R$, $CH_2=CH-OC(O)R$, $CH_2=CH(CH_2)_n-OC(O)R$, $CH_2=CH(OR)$, $CH_2=CH(CH_2)_n(OR)$, $CH_2=CHSi(R)_{3-T}(OR)_T$, $CH_2=CH(CH_2)_nSi(R)_{3-T}(OR)_T$, $CH_2=CH-OSi(R)_{3-T}(OR)_T$, $CH_2=CH(CH_2)_n-OSi(R)_{3-T}(OR)_1$ or $CH_2=CHCl$. Each R is chosen from —H, substituted ($C_1$-$C_{30}$)hydrocarbyl, unsubstituted ($C_1$-$C_{30}$)hydrocarbyl, substituted ($C_1$-$C_{30}$)heterohydrocarbyl, or unsubstituted ($C_1$-$C_{30}$)heterohydrocarbyl. Subscript T is 0, 1, 2, or 3. Subscript n is 1 to 10. In embodiments in which the polar monomer is an alkyl acrylate, substituted ($C_1$-$C_{30}$)hydrocarbyl acrylate, unsubstituted ($C_1$-$C_{30}$)hydrocarbyl acrylate, substituted ($C_1$-$C_{30}$)heterohydrocarbyl acrylate, or unsubstituted ($C_1$-$C_{30}$)heterohydrocarbyl acrylate, or unsubstituted ($C_1$-$C_{30}$)heterohydrocarbyl acrylate, the polar ethylene-based copolymer may be de-esterified to form an acrylic acid ethylene-based copolymer.

In some embodiments of the polymerization process, the alkyl acrylate monomer may be, by way of example and not limitation, methyl acrylate, ethyl acrylate, n-butyl acrylate, iso-butyl acrylate, t-butyl acrylate, or combinations thereof. In various embodiments, the alkyl acrylate has an alkyl group with from 1 to 8 carbons. This is designated a $C_1$-$C_8$-alkyl acrylate. In particular embodiments, the alkyl acrylate is t-butyl acrylate or n-butyl acrylate.

In some embodiments of the polymerization process the optional α-olefin monomer may be, by way of example and not limitation, propylene, 1-butene, 1-pentene, 1-hexene, 1-heptene, 1-octene, 1-nonene, 1-decene, 1-undecene, 1-dodecene, 4-methyl-1-pentene, styrene, or combinations thereof. In one or more embodiments of the polymerization process, the process may further include a cyclic olefin, such as cyclobutene, cyclopentene, norbornene, and norbornene derivatives that are substituted in the 5- and 6-positions with ($C_1$-$C_{20}$)hydrocarbyl groups.

In illustrative embodiments, the catalyst systems may include a procatalyst according to formula (I) having the structure of the Procatalysts 1-5 listed below:

Procatalyst 1

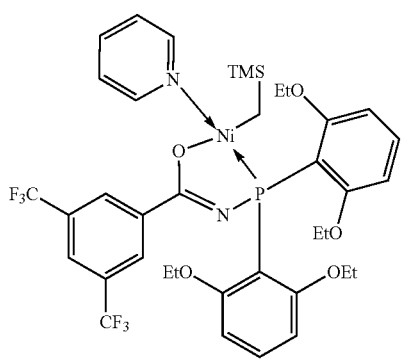

Procatalyst 2

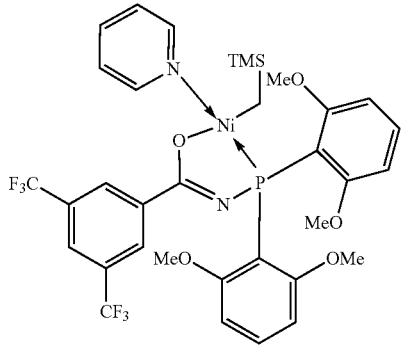

Procatalyst 3

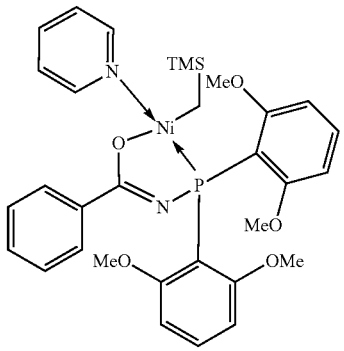

Procatalyst 4

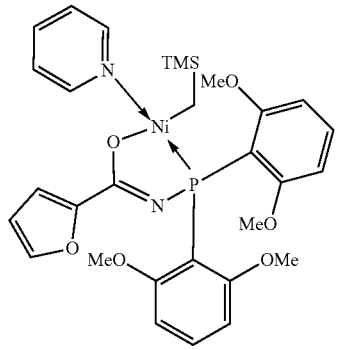

Procatalyst 5

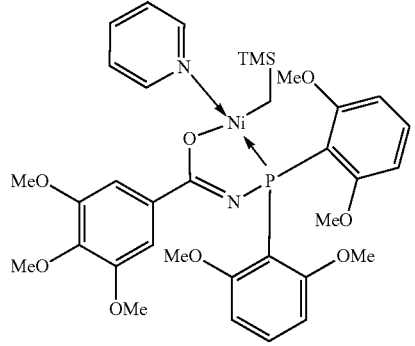

wherein TMS is trimethylsilyl, Me is methyl, and Et is ethyl.

Ethylene/Acrylate Copolymer

In various embodiments, the polymerization process of this disclosure may produce ethylene-based copolymer, in which the polar ethylene-based copolymer contains at least 50 percent by weight (wt. %) ethylene based on the weight of the polar ethylene-based copolymer. In some embodiments, the polar ethylene-based copolymer is the reaction product of 70 wt % to 99.9 wt. % ethylene units and 0.1 wt. % to 30 wt. % polar comonomer units based on the sum of the ethylene units and the polar comonomer units.

In one or more embodiments, the polymerization process of this disclosure may include ethylene monomers, alkyl acrylate monomers, and optionally one or more α-olefins. In some embodiments of the polymerization process which includes α-olefins, the α-olefins may be incorporated into the produced polymers in amounts of from 0.01 wt. % to 49.9 wt. % based on the weight of the ethylene-based copolymer.

In various embodiments, the polymerization process of this disclosure may produce ethylene-based copolymer with a molecular weight of from 2,000 g/mol to 1,000,000 g/mol. In some embodiments, the produced polymer has a molecular weight of from 25,000 g/mol to 900,000 g/mol, from 30,000 g/mol to 800,000 g/mol, or from 10,000 g/mol to 300,000 g/mol.

General Procedure for PPR Screening Experiments

Polyolefin catalysis screening was performed in a high-throughput parallel polymerization reactor (PPR) system. The PPR system was comprised of an array of 48-single-cell (6×8 matrix) reactors in an inert atmosphere glovebox. Each cell was equipped with a glass insert (reactor tube) with an internal working liquid volume of approximately 5 mL. Each cell had independent controls for pressure and was continuously stirred at 500 Hz. Catalyst, ligand, and metal precursor solutions, and optional activator solutions (if used), unless otherwise noted, were prepared in toluene. Unless otherwise indicated, ligands were metallated with a 1:1 ligand:metal (L:M) ratio by premixing a solution of metal precursor with a solution of the ligand. In many cases, the procatalyst complex resulting from the metallation reactions was isolated and purified prior to introduction to the PPR reactor. All liquids (i.e., solvent, t-butyl acrylate, and catalyst solutions and optional activator solutions (if used)) were added via robotic syringes. Gaseous reagents (i.e., ethylene) were added via a gas injection port. Prior to each run, the reactors were heated to 50° C., purged with ethylene, and vented. Tert-butyl acrylate was filtered through a short column of activated alumina prior to use to remove any polymerization inhibitors (e.g., 4-methoxyphenol).

All desired cells were injected with t-butyl acrylate followed with a portion of toluene. The reactors were heated to the run temperature and then pressurized to the appropriate pressure with ethylene. Isolated procatalyst complexes or in situ metallated ligands and optional activator solutions (if used) were then added to the cells. Each catalyst addition was chased with a small amount of toluene so that after the final addition, a total reaction volume of 5 mL was reached. Upon addition of the catalyst, the PPR software began monitoring the pressure of each cell. The desired pressure (within approximately 2-6 psig) was maintained by the supplemental addition of ethylene gas by opening the valve at the set point minus 1 psi and closing it when the pressure reached 2 psi higher. All drops in pressure were cumulatively recorded as "Uptake" or "Conversion" of the ethylene for the duration of the run or until the uptake or conversion requested value was reached, whichever occurred first. Each reaction was then quenched by addition of 10% oxygen in nitrogen for 30 seconds at 40 psi higher than the reactor pressure (the elapsed time from the start of the run to the point the quench is initiated is the "Quench Time'). The shorter the Quench Time, the more active the catalyst. In order to prevent the formation of too much polymer in any given cell, the reaction was quenched upon reaching a predetermined uptake level of 80 psig. After all the reactors were quenched, they were allowed to cool to about 60° C. They were then vented and the reactor tubes were removed and placed in a centrifugal evaporator. The polymer samples were then dried in a centrifugal evaporator at 60° C. for 12 hours, weighed to determine polymer yield and submitted for IR (t-butyl acrylate incorporation), GPC (molecular weight, polydispersity (PDI)), and DSC (melting point) analysis.

General Procedure for Batch Reactor Experiments

Note: Contact with tert-butyl acrylate should be minimized as acrylates are sensitizers, for example, using a lidded dump pot and a well-ventilated fume hood. Caution should be taken when transferring reactor contents to the dump pot and while emptying the dump pot in a fume hood.

Polymerization reactions were conducted in a 2-L Parr batch reactor. The reactor was heated by an electrical heating mantle, and was cooled by an internal serpentine cooling coil containing cooling water. The water was pre-treated by passing through an Evoqua water purification system. Both the reactor and the heating/cooling system were controlled and monitored by a Camile TG process computer. The bottom of the reactor was fitted with a dump valve, which emptied the reactor contents into a lidded dump pot. The dump pot was prefilled with a catalyst kill solution (typically 5 mL of an Irgafos/Irganox/toluene mixture). The lidded dump pot was vented to a 15 gal. blow-down tank, with both the pot and the tank being $N_2$-purged. All chemicals used for polymerization or catalyst makeup were run through purification columns in order to remove any impurities that may affect polymerization. The toluene was passed through two columns, the first containing A2 alumina and the second containing Q5 reactant. The tert-butyl acrylate was filtered through activated alumina. The ethylene was passed through two columns, the first containing A204 alumina and 4 Å molecular sieves and the second containing Q5 reactant. The $N_2$, used for transfers, was passed through a single column containing A204 alumina, 4 Å molecular sieves, and Q5 reactant.

The reactor was loaded first from a shot tank that contained toluene and tert-butyl acrylate. The shot tank was filled to the load set points by use of a differential pressure transducer. After solvent/acrylate addition, the shot tank was rinsed twice with toluene and the rinses were transferred to the reactor. The reactor was then heated to the desired polymerization temperature set point. Upon reaching the temperature set point, ethylene was added to the reactor in order to reach the desired pressure set point. The amount of ethylene added to the reactor was monitored by a micro-motion flow meter.

The catalysts were handled in an inert atmosphere glove box, and introduced to the reactor as solutions in toluene. The catalyst solution was drawn into a syringe and pressure-transferred into the catalyst shot tank. This was followed by 3 rinses of toluene, 5 mL each. Catalyst was only added after the reactor pressure set point was achieved.

Immediately after catalyst addition, the run timer began. Ethylene was then fed (via Camile control) to the reactor in order to maintain the pressure set point. The ethylene/tert-butyl acrylate copolymerization reactions were run for 75 minutes or until 40 g of ethylene uptake occurred, whichever was shorter. The agitator was then stopped and the bottom dump valve was opened to empty reactor contents to the lidded dump pot. The valves on the lidded dump pot were closed and the sealed dump pot was disconnected from the reactor and taken to a fume hood. Once in the fume hood, the lid was removed from the dump pot and the contents were poured into trays. The trays were left in the hood for a minimum of 36 hours to allow solvent and tert-butyl acrylate to evaporate. The trays containing the remaining polymer were then transferred to a vacuum oven, where they were heated up to 140° C. under vacuum to remove any residual volatile materials. After the trays cooled to ambient temperature, the polymers were weighed for yield/efficiencies, and submitted for polymer testing if so desired.

GPC Procedure

High temperature GPC analysis was performed using a Dow Robot Assisted Delivery (RAD) system equipped with a Polymer Char infrared detector (IR5) and Agilent PL-gel Mixed A columns. Decane (10 μL) was added to each sample for use as an internal flow marker. Samples were first diluted in 1,2,4-trichlorobenzene (TCB) stabilized with 300 ppm of butylated hydroxytoluene (BHT) at a concentration of 10 mg/mL and dissolved by stirring at 160° C. for 120 minutes. Prior to injection the samples are further diluted with TCB stabilized with BHT to a concentration of 3 mg/mL. Samples (250 μL) are eluted through one PL-gel 20 μm (50 mm×7.5 mm) guard column followed by two PL-gel 20 μm (300 mm×7.5 mm) Mixed-A columns maintained at 160° C. with TCB stabilized with BHT at a flowrate of 1.0 mL/min. The total run time was 24 minutes. To calibrate for molecular weight (MW), Agilent EasiCal polystyrene standards (PS-1 and PS-2) were diluted with 1.5 mL of TCB stabilized with BHT and dissolved by stirring at 160° C. for 15 minutes. These standards are analyzed to create a $3^{rd}$-order MW calibration curve. Molecular weight units are converted from polystyrene (PS) units to polyethylene (PE) units using a daily Q-factor calculated to be around 0.4 using the average of 5 Dowlex 2045 reference samples.

FT-IR Procedure

The 10 mg/mL samples prepared for GPC analysis are also utilized to quantify tert-butyl acrylate (tBA) incorporation by Fourier transform infrared spectroscopy (FTIR). A Dow robotic preparation station heated and stirred the samples at 160° C. for 60 minutes, then deposited 130-μL portions into stainless wells promoted on a silicon wafer. The TCB was evaporated off at 160° C. under nitrogen purge. IR spectra were collected using a Nexus 6700 FT-IR equipped with a DTGS KBr detector from 4000-400 cm$^{-1}$ utilizing 128 scans with a resolution of 4 cm$^{-1}$. Ratio of tBA (C=O: 1762-1704 cm$^{-1}$) to ethylene (CH$_2$: 736-709 cm$^{-1}$) peak areas were calculated and fit to a linear calibration curve to determine total tBA.

DSC Procedure

Melt temperature (Tm), glass transition temperature (Tg), crystallization temperature (Tc), and Heat of Melt were measured on solid polymer samples by differential scanning calorimetry (DSC Q2000, TA Instruments, Inc.) using a Heat-Cool-Heat temperature profile. Open-pan DSC samples of 3-6 mg of polymer are subjected to the temperature profile below and traces were analyzed individually using TA Universal Analysis software or TA Instruments TRIOS software.

Equilibrate at 175.00° C.
Isothermal for 3 minutes
Ramp 30.00° C./min to 0.00° C.
Ramp 10.00° C./min to 175.00° C.

EXAMPLES

Examples 1 to 6 are synthetic procedures for ligand intermediates and ligands. Examples 7 to 12 are synthetic procedures for isolated procatalysts. In Examples 13 and 14, the results of the polymerization reactions of Procatalysts 1 to 5 are tabulated and discussed. One or more features of the present disclosure are illustrated in view of the examples as follows:

General Considerations

All reactions were performed in a nitrogen-purged glove box unless otherwise noted. All solvents and reagents were obtained from commercial sources and used as received unless otherwise noted. Anhydrous toluene, hexanes, tetrahydrofuran, and diethyl ether were purified via passage through activated alumina and, in some cases, Q-5 reactant. Alumina for solvent purification was activated by passing a stream of nitrogen through the alumina for 8 hours at 300° C. Q-5 reactant was activated by heating at 200° C. under a stream of nitrogen for 4 hours, followed by a stream of 5% hydrogen in nitrogen at 200° C. for 3 hours, and finally flushing with nitrogen gas. Solvents used for experiments performed in a nitrogen-filled glovebox were further dried by storage over activated 4 Å molecular sieves. Glassware for moisture-sensitive reactions was dried in an oven overnight prior to use. HRMS analyses were performed using an Agilent 1290 Infinity LC with a Zorbax Eclipse Plus C18 1.8 μm 2.1×50 mm column coupled with an Agilent 6230 TOF Mass Spectrometer with electrospray ionization. NMR spectra were recorded on Varian 400-MR and VNMRS-500 spectrometers. $^1$H NMR data are reported as follows: chemical shift (multiplicity (br=broad, s=singlet, d=doublet, t=triplet, q=quartet, p=pentet, sex=sextet, sept=septet and m=multiplet), integration, and assignment). Chemical shifts for $^1$H NMR data are reported in ppm downfield from tetramethylsilane (TMS, δ scale) using residual protons in the deuterated solvent as references. $^{13}$C NMR data were determined with $^1$H decoupling, and the chemical shifts are reported in ppm versus tetramethylsilane. $^{13}$C NMR spectra of phosphines were complex due to C—P coupling. Chemical shifts for $^{31}$P NMR data are reported in ppm relative to external neat H$_3$PO$_4$. Deuterated solvents for NMR analyses were purchased from Cambridge Isotope Laboratories and stored over activated 4 Å molecular sieves in a nitrogen-purged glove box. Chlorobis(2,6-dimethoxyphenyl)phosphine, chlorobis(2,6-diethoxyphenyl)phosphine, and bis((trimethylsilyl)methyl)bis(pyridine)nickel(II) were prepared according to literature procedures.

Preparation of Ligands

Example 1—N-(bis(2,6-dimethoxyphenyl)phosphanyl)-3,5-bis(trifluoromethyl)benzamide

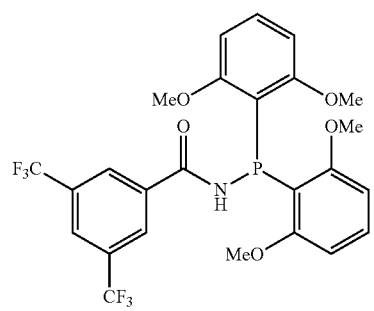 [SMILES: COc1cccc(OC)c1P(NC(=O)c1cc(C(F)(F)F)cc(C(F)(F)F)c1)c1c(OC)cccc1OC]

In a glove box, 3,5-bis(trifluoromethyl)benzamide (300 mg, 1.17 mmol) and a stir bar were added to a 20-mL vial, dissolved in 8 mL of THF, and cooled to −35° C. overnight. The mixture was taken out of the freezer, n-butyl lithium (2.0 M, 0.64 mL, 1.3 mmol, 1.1 eq) was added slowly, and the reaction mixture was put back in the freezer. After 20 minutes, the reaction mixture was taken out of the freezer, and a slurry of chlorobis(2,6-dimethoxyphenyl)phosphine (362 mg, 1.19 mmol, 1.02 equiv) in 3 mL of THF was added. The reaction mixture was allowed to warm slowly to room temperature while stirring for an additional hour. All volatiles were removed under vacuum and 10 mL of dichloromethane was added to the resultant residue. The solution was filtered through a plug of Celite to remove LiCl. The filtrate was clear and light yellow. The filtrate was concentrated to about 2 mL, the product was triturated with hexane, and collected by filtration as an off-white powder. $^1$H and $^{31}$P NMR confirmed that the off-white powder that was isolated was the desired product (402 mg, 0.72 mmol, 61% yield).

$^1$H NMR (400 MHz, Chloroform-d) δ 9.51 (s, 1H), 8.35 (s, 2H), 8.01 (s, 1H), 7.26 (t, J=8.3 Hz, 2H), 6.55 (dd, J=8.3, 2.7 Hz, 4H), 3.81 (s, 12H) ppm. $^{13}$C NMR (126 MHz, Chloroform-d) δ 161.87 (d, J=9.7 Hz), 137.91, 131.92 (d, J=34.1 Hz), 130.95, 127.65, 124.57, 124.18, 122.01, 114.43, 104.58, 56.02 ppm. $^{31}$P NMR (162 MHz, Chloroform-d) δ −2.16 ppm. $^{19}$F NMR (376 MHz, Chloroform-d) δ −62.91 ppm. HRMS (ESI+) (m/z): [M+H] calcd for $C_{45}H_{60}N_2O_5P$: 562.121; found: 562.116.

Example 2—N-(bis(2,6-dimethoxyphenyl)phosphanyl)-3,4,5-trimethoxybenzamide

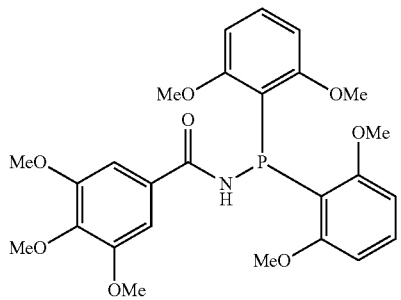 [SMILES: COc1cc(C(=O)NP(c2c(OC)cccc2OC)c2c(OC)cccc2OC)cc(OC)c1OC]

In a glove box, 3,4,5-trimethoxybenzamide (300 mg, 1.42 mmol) and a stir bar were added to a 20-mL vial, dissolved in 10 mL of THF, and cooled to −35° C. overnight. The mixture was taken out of the freezer, n-butyl lithium (2.0 M, 0.78 mL, 1.6 mmol, 1.1 eq) was added slowly, and the reaction mixture was put back in the freezer. After 20 minutes, the reaction mixture was taken out of the freezer and a slurry of chlorobis(2,6-dimethoxyphenyl)phosphane (442 mg, 1.45 mmol, 1.02 eq) in 4 mL of THF was added. The reaction mixture was allowed to warm slowly to room temperature while stirring for an additional hour. A white precipitate had formed and it was collected by filtration and washed with THF and hexane. The white powder was confirmed as the desired product (495 mg, 0.95 mmol, 67% yield).

$^1$H NMR (400 MHz, Chloroform-d) δ 9.01 (s, 1H), 7.23 (td, J=8.3, 0.7 Hz, 2H), 7.14 (s, 2H), 6.53 (dd, J=8.3, 2.6 Hz, 4H), 4.01-3.86 (m, 9H), 3.78 (s, 12H) ppm. $^{13}$C NMR (126 MHz, Chloroform-d) δ 161.91 (d, J=9.5 Hz), 152.93, 140.71, 131.41, 130.56, 115.57 (d, J=26.9 Hz), 105.00, 104.66, 67.96, 60.89, 56.25, 56.11. $^{31}$P NMR (162 MHz, Chloroform-d) δ −4.88 (d, J=108.0 Hz) ppm. HRMS (ESI+) (m/z): [M+H] calcd for $C_{26}H_{30}NO_8P$: 516.178; found: 516.175.

Example 3—N-(bis(2,6-diethoxyphenyl)phosphanyl)-3,5-bis(trifluoromethyl)benzamide

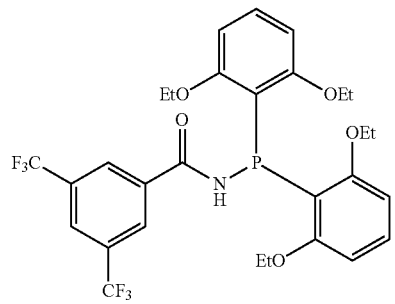 [SMILES: CCOc1cccc(OCC)c1P(NC(=O)c1cc(C(F)(F)F)cc(C(F)(F)F)c1)c1c(OCC)cccc1OCC]

In a glove box, a glass jar equipped with a stir bar was charged with 3,5-bis(trifluoromethyl)benzamide (1.0 g, 3.89 mmol) and chilled THF (26.5 mL). The clear solution was placed in the glovebox freezer at −35° C. for 30 minutes. After 30 minutes, the solution was removed from the freezer, and 2.5 M n-butyllithium in hexanes (1.72 mL, 4.30 mmol) was added dropwise while stirring. The resulting red-orange solution was returned to the freezer. After 20 minutes, the reaction mixture was removed from the freezer and a chilled murky solution of bis(2,6-diethoxyphenyl)chlorophosphine (1.57 g, 3.97 mmol) in THF (10 mL) was added. The reaction mixture was allowed to warm to room temperature while stirring for 1 hour. After 1 hour, an aliquot of the resulting red-brown solution was removed and analyzed by $^{31}$P NMR spectroscopy to check for completion. The $^{31}$P NMR spectrum showed that the reaction was complete. The reaction mixture was concentrated under vacuum to dryness and anhydrous dichloromethane (33 mL) was added. The reaction mixture was filtered through a plug of Celite and concentrated under vacuum to afford a dark peach solid (2.62 g). The solid was triturated with hexanes and dichloromethane (2 mL) was added. The slurry was stirred for 5 minutes at room temperature and the solid was collected by filtration and washed with hexanes to afford 1.79 g (2.92 mmol, 75%) of the desired product as a peach-colored solid.

$^1$H NMR (400 MHz, Chloroform-d) δ 9.16 (s, 1H), 8.30 (s, 2H), 7.99 (s, 1H), 7.20 (t, J=8.3 Hz, 2H), 6.50 (dd, J=8.3, 2.7 Hz, 4H), 3.98 (p, J=7.6, 6.8 Hz, 9H), 1.23 (t, J=7.0 Hz, 13H) ppm. $^{13}$C NMR (101 MHz, Chloroform-d) δ 165.87 (d, J=17.2 Hz), 161.05 (d, J=9.5 Hz), 138.31, 131.85 (q, J=33.4, 32.6 Hz), 130.47, 127.78, 124.48, 121.73, 115.74 (d, J=26.4 Hz), 105.32, 64.47, 14.48 ppm. $^{31}$P NMR (162 MHz, Chloroform-d) δ −0.30 ppm. $^{19}$F NMR (376 MHz, Chloroform-d) δ −63.19 ppm. HRMS (ESI+) (m/z): [M+H] calcd for $C_{29}H_{31}F_6NO_5P$: 618.1838; found: 618.1753.

Example 4—N-(bis(2,6-dimethoxyphenyl)phosphanyl)furan-2-carboxamide

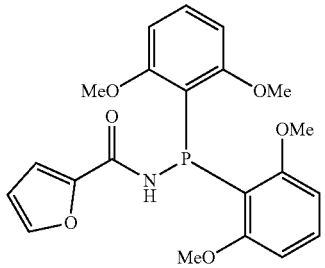 [SMILES: COc1cccc(OC)c1P(NC(=O)c1ccco1)c1c(OC)cccc1OC]

In a glove box, furan-2-carboxamide (258 mg, 2.32 mmol) and a stir bar were added to a 20-mL vial, dissolved in 10 mL of THF, and cooled to −35° C. overnight. The mixture was taken out of the freezer, n-butyllithium (2.0 M, 1.28 mL, 2.44 mmol, 1.1 eq) was added slowly, and the reaction mixture was placed back in the freezer for 15 min. The reaction mixture was removed from the freezer and a slurry of chlorobis(2,6-dimethoxyphenyl)phosphine (831 mg, 2.44 mmol, 1.05 eq) in 5 mL of THF was added slowly. The reaction mixture was allowed to warm to room temperature while stirring for 2 h. All volatiles were then removed from the reaction mixture under vacuum and the resultant residue was triturated with dichloromethane and filtered through a pad of Celite. The filtrate was concentrated to about 2 mL, the product was triturated with hexane, and collected by filtration as a white powder (766 mg isolated, 1.83 mmol, 79% yield).

$^1$H NMR (400 MHz, Chloroform-d) δ 9.25 (s, 1H), 7.63-7.45 (m, 1H), 7.21 (t, J=8.3 Hz, 2H), 7.15 (d, J=3.5 Hz, 1H), 6.68-6.42 (m, 5H), 3.78 (d, J=0.9 Hz, 12H) ppm. $^{13}$C NMR (126 MHz, Chloroform-d) δ 161.94 (d, J=9.6 Hz), 143.64, 130.56, 128.62 (d, J=102.0 Hz), 115.12 (d, J=25.9 Hz), 114.13, 112.13, 104.47, 55.98 ppm. $^{31}$P NMR (162 MHz, Chloroform-d) δ −7.34 ppm. HRMS (ESI+) (m/z): [M+H] calcd for $C_{21}H_{24}NO_6P$: 416.1257; found: 416.1226.

Example 5—Synthesis of N-(bis(2,6-dimethoxyphenyl)phosphanyl)benzamide

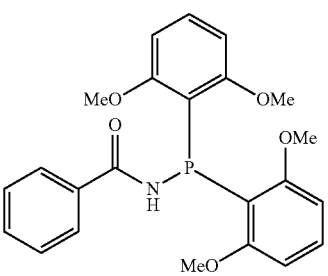 [SMILES: COc1cccc(OC)c1P(NC(=O)c1ccccc1)c1c(OC)cccc1OC]

In a glove box, a 20-mL vial was charged with benzamide (100 mg, 0.83 mmol, 1.0 eq), 4-pyrrolidinopyridine (196 mg, 1.32 mmol, 1.6 eq), chlorobis(2,6-dimethoxyphenyl) phosphine (281 mg, 0.83 mmol, 1.0 eq), 8 mL of THF, and a stir bar. The colorless solution was heated to 65° C. and stirred for 18 h. The next day, the solution was filtered to remove salts and all volatiles were removed from the filtrate under vacuum. Toluene was added to the resultant residue and a precipitate formed. The white solid was isolated by filtration, washed with hexane, dried, and was identified by NMR spectroscopy to be clean product (182 mg). An equal portion of hexane was added to the filtrate and it was placed in the freezer at −35° C. overnight. The product precipitated out of solution and was collected by filtration and dried (102 mg). The two powders were combined to give 284 mg of product (0.67 mmol, 81% yield).

$^1$H NMR (400 MHz, Chloroform-d) δ 9.10 (s, 2H), 7.88 (d, J=7.4 Hz, 4H), 7.64-7.38 (m, 5H), 7.21 (t, J=8.3 Hz, 4H), 6.53 (d, J=2.6 Hz, 4H), 3.76 (s, 19H) ppm. $^{13}$C NMR (101 MHz, Chloroform-d) δ 161.98 (d, J=9.5 Hz), 131.09, 130.52, 128.31, 127.38, 115.71 (d, J=27.1 Hz), 104.66, 56.13 ppm. $^{31}$P NMR (162 MHz, Chloroform-d) δ −5.29 ppm. HRMS (ESI+) (m/z): [M+H] calcd for $C_{21}H_{24}NO_6P$: 426.1473; found: 426.148.

Example 6—N-(diphenylphosphanyl)benzamide

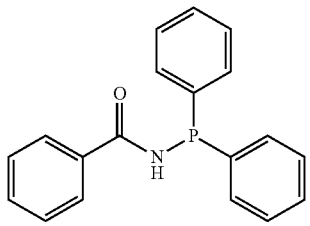 [SMILES: O=C(NP(c1ccccc1)c1ccccc1)c1ccccc1]

In a glove box, benzamide (250 mg, 1.80 mmol) and a stir bar were added to a 100-mL jar, dissolved/suspended in 20 mL of THF, and cooled to −35° C. overnight. The mixture was removed from the freezer, n-butyllithium (2.0 M, 0.99 mL, 1.96 mmol, 1.1 eq) was added slowly, and the reaction mixture was placed back in the freezer for 15 min. The mixture was removed from the freezer and a slurry of chlorodiphenylphosphine (0.523 mL, 1.89 mmol, 1.05 eq) in 5 mL of THF was added slowly with stirring. The solution was allowed to warm to room temperature while stirring for 2 h. All volatiles were then removed from the solution under vacuum and the resultant residue was triturated with dichloromethane and filtered through a pad of Celite. All volatiles were removed from the filtrate under vacuum and toluene was added to the resultant residue. The product mostly precipitated as a white solid and was further triturated with hexane. The product was collected by filtration as a white powder. The filtrate was concentrated to about 2 mL and the product was triturated with hexane and collected by filtration. The product was isolated as a white powder. The two batches of white powder were combined to give 362 mg (1.19 mmol, 66% yield).

$^1$H NMR (400 MHz, Chloroform-d) δ 7.85 (dd, J=8.4, 1.4 Hz, 2H), 7.59-7.37 (m, 13H), 6.52 (d, J=5.8 Hz, 1H) ppm. $^{13}$C NMR (101 MHz, Chloroform-d) δ 170.03, 138.22 (d, J=14.8 Hz), 134.06, 132.12, 131.65 (d, J=21.7 Hz), 129.73, 128.81 (d, J=6.7 Hz), 128.67, 127.52 ppm. $^{31}$P NMR (162 MHz, Chloroform-d) δ 25.39 ppm. HRMS (ESI+) (m/z): [M+H] calcd for $C_{19}H_{17}NOP$: 306.1041; found: 306.1034.

Preparation of Ni-Complexes

Example 7—Synthesis of Procatalyst 2

((Z)-N-(bis(2,6-dimethoxyphenyl)phosphanyl)-3,5-bis(trifluoromethyl)benzimidate)((trimethylsilyl)methyl)(pyridine)nickel (II)

Example 8—Synthesis of Procatalyst 5

((Z)-N-(bis(2,6-dimethoxyphenyl)phosphanyl)-3,4,5-trimethoxybenzimidate)(pyridine)((trimethylsilyl)methyl)nickel(II)

In a glove box, a 20-mL vial was charged with bis((trimethylsilyl)methyl)bis(pyridine)nickel(II) (73 mg, 0.18 mmol, 1.05 eq), a stir bar, and 1 mL of toluene. A slurry of N-(bis(2,6-dimethoxyphenyl)phosphanyl)-3,5-bis(trifluoromethyl)benzamide (100 mg, 0.18 mmol) in 4 mL of toluene was then added slowly to the orange solution. The resultant solution was very dark brown/orange in color. After stirring the solution for 30 min at 45° C., the color of the reaction mixture had lightened significantly and was red. $^{31}$P NMR spectroscopy showed that the metallation reaction was complete after 30 minutes. All volatiles were removed from the solution under vacuum, leaving behind a dark red sticky residue. The product was triturated with hexane and stirred vigorously. The product was collected by filtration and dried (105 mg, 0.14 mmol, 75% yield).

$^1$H NMR (400 MHz, Benzene-d$_6$) δ 8.94 (dd, J=4.8, 1.7 Hz, 2H), 8.91-8.84 (m, 2H), 7.71 (s, 1H), 7.22-7.07 (m, 4H), 6.84 (tt, J=7.6, 1.7 Hz, 1H), 6.54 (t, J=6.7 Hz, 2H), 6.34 (dd, J=8.3, 3.7 Hz, 4H), 3.36 (s, 12H), −0.16 (s, 9H), −0.46 (d, J=8.8 Hz, 2H) ppm. $^{13}$C NMR (101 MHz, Benzene-d$_6$) δ 174.14 (d, J=3.7 Hz), 161.47 (d, J=2.1 Hz), 150.64, 139.45 (d, J=19.2 Hz), 136.36, 130.57, 129.93, 123.56, 113.02 (d, J=57.3 Hz), 104.64 (d, J=4.5 Hz), 55.35, 31.59, 22.68, 13.97, 1.97, −16.46 (d, J=28.6 Hz) ppm. $^{31}$P NMR (162 MHz, Benzene-d$_6$) δ 54.98 ppm. $^{19}$F NMR (376 MHz, Benzene-d$_6$) δ −62.47 ppm.

In a glove box, a 20-mL vial was charged with bis((trimethylsilyl)methyl)bis(pyridine)nickel (114 mg, 0.29 mmol, 1.0 eq), a stir bar, and 5 mL of toluene followed by pyridine (23 μL, 0.29 mmol, 1.0 eq). Solid N-(bis(2,6-dimethoxyphenyl)phosphanyl)-3,4,5-(trimethoxy)benzamide (150 mg, 0.29 mmol) was then added slowly to the orange solution. The resultant solution was very dark brown/yellow. The reaction mixture was heated to 55° C. and stirred for 90 minutes. The metallation reaction was complete after 90 minutes as indicated by $^{31}$P NMR spectroscopy. The solution was filtered through a Celite plug, and the filtrate was concentrated to about 3 mL at which point orange precipitate had begun forming. The product was triturated with hexane (~30 mL) and the resulting solution was placed in the freezer overnight. The mixture was removed from the freezer and the product was collected by filtration, washed with cold pentane, and dried (182 mg, 0.25 mmol, 85% yield).

$^1$H NMR (400 MHz, Benzene-d$_6$) δ 9.12-8.92 (m, 2H), 7.79 (s, 2H), 7.20-7.08 (m, 2H+C$_6$D$_6$ signal), 6.91 (s, 1H), 6.59 (s, 1H), 6.38 (dd, J=8.3, 3.6 Hz, 4H), 3.83 (s, 3H), 3.41 (s, 12H), 3.33 (s, 6H), −0.11 (s, 9H), −0.49 (d, J=8.5 Hz, 2H) ppm. $^{13}$C NMR (126 MHz, Benzene-d$_6$) δ 177.70, 161.51, 152.72, 150.96, 140.78, 136.02, 132.56 (d, J=18.6 Hz), 130.16, 123.35, 114.12 (d, J=56.1 Hz), 108.52, 104.68 (d, J=4.4 Hz), 60.07, 55.48, 55.39, 2.12, −17.08 (d, J=27.8 Hz) ppm. $^{31}$P NMR (162 MHz, Benzene-d$_6$) δ 55.06 ppm.

Example 9—Synthesis of Procatalyst 3; ((Z)-N-(bis(2,6-dimethoxyphenyl)phosphanyl)benzimidate)(pyridine)((trimethylsilyl)methyl)nickel(II)

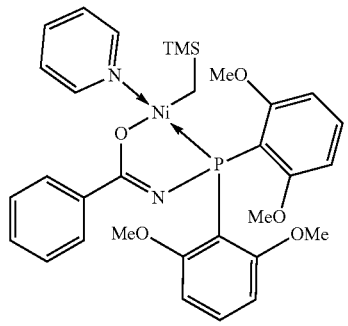

In a glove box, a 20-mL vial was charged with bis((trimethylsilyl)methyl)bis(pyridine)nickel(II) (9.2 mg, 0.024 mmol, 1.0 eq), N-(bis(2,6-dimethoxyphenyl)phosphanyl)benzamide (10 mg, 0.024 mmol, 1.0 eq), a stir bar, and 2 mL $C_6D_6$. The dark red reaction was heated to 60° C. for 1 h and cooled. $^1$H NMR spectroscopy was consistent with what is expected for the title structure. All volatiles were removed under vacuum and hexane was added to the sticky residue, resulting in a dark yellow solid. The mother liquor was removed with a pipette and the product was dried (no yield was determined).

$^1$H NMR (500 MHz, Benzene-$d_6$) δ 9.14-8.91 (m, 2H), 8.52 (dd, J=7.9, 1.9 Hz, 2H), 7.21-7.01 (m, 9H), 6.84 (s, 1H), 6.67-6.44 (m, 2H), 6.33 (dd, J=8.3, 3.6 Hz, 4H), 3.36 (s, 12H), −0.15 (s, 9H), −0.52 (d, J=8.5 Hz, 2H) ppm. $^{13}$C NMR (126 MHz, Benzene-$d_6$) δ 177.78 (d, J=2.4 Hz), 164.31, 161.54 (d, J=1.9 Hz), 137.28 (d, J=18.5 Hz), 135.95, 127.11, 123.39 (d, J=1.9 Hz), 114.30 (d, J=56.6 Hz), 104.84 (d, J=4.4 Hz), 55.55, 2.11, −16.85 (d, J=28.2 Hz) ppm. $^{31}$P NMR (162 MHz, Benzene-$d_6$) δ 54.79 ppm.

Example 10—Synthesis of Procatalyst 1

((Z)-N-(bis(2,6-diethoxyphenyl)phosphanyl)-3,5-bis(trifluoromethyl)benzimidate)(pyridine)((trimethylsilyl)methyl)nickel (II)

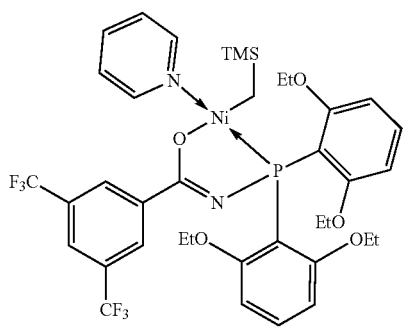

In a glove box, a 110-mL jar was charged with bis((trimethylsilyl)methyl)bis(pyridine)nickel(II) (503 mg, 1.28 mmol, 1.0 eq), a stir bar, and 10 mL of toluene. A slurry of N-(bis(2,6-diethoxyphenyl)phosphanyl)-3,5-bis(trifluoromethyl)benzamide (750 mg, 1.28 mmol) in 20 mL of toluene was then added slowly to the orange solution. The resultant solution was very dark brown/yellow in color. The reaction mixture was stirred for 20 min at 45° C., after which time $^{31}$P NMR spectroscopy showed that the reaction was nearly complete (some of the dialkyl-complex and free ligand remained). Pyridine (0.100 mL, 1.28 mmol, 1.0 eq) was added to the reaction mixture and the mixture was heated to 45° C. for an additional 20 min. $^{31}$P NMR spectroscopy showed that the reaction had gone to completion. The reaction mixture was cooled to room temperature and filtered through a plug of Celite. All volatiles were then removed from the filtrate under vacuum. Pentane was added and removed under vacuum to dry the crude product. The resulting solid was dissolved in a minimal of amount of toluene and the product was triturated with excess pentane. The orange solid was collected by filtration, washed with pentane, and dried (926 mg, 1.10 mmol 86% yield).

$^1$H NMR (400 MHz, Chloroform-d) δ 9.16 (s, 1H), 8.30 (s, 2H), 7.99 (s, 1H), 7.20 (t, J=8.2 Hz, 2H), 6.50 (dd, J=8.3, 2.7 Hz, 5H), 4.08-3.91 (m, 8H), 1.23 (t, J=7.0 Hz, 12H) ppm. $^{13}$C NMR (101 MHz, Chloroform-d) δ 166.01 (d, J=17.4 Hz), 161.18 (d, J=9.5 Hz), 138.44, 131.99 (q, J=33.3, 32.4 Hz), 130.60, 127.91, 124.62, 121.87, 115.87 (d, J=26.6 Hz), 105.45, 64.61, 14.61 ppm. $^{31}$P NMR (162 MHz, Chloroform-d) δ −0.30 ppm. $^{19}$F NMR (376 MHz, Chloroform-d) δ −63.19 ppm.

Example 11—Synthesis of Procatalyst 4

((Z)-N-(bis(2,6-dimethoxyphenyl)phosphanyl)furan-2-carbimidate)(pyridine)((trimethylsilyl)methyl)nickel (II)

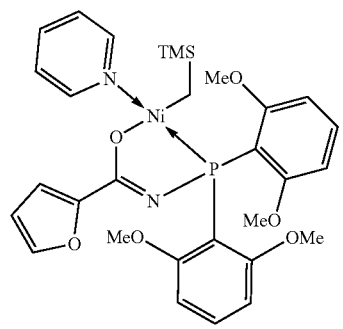

In a glove box, a 20-mL vial was charged with bis((trimethylsilyl)methyl)bis(pyridine)nickel(II) (141 mg, 0.36 mmol, 1.0 eq), pyridine (0.029 mL, 0.36 mmol), a stir bar, and 4 mL of toluene. A slurry of N-(bis(2,6-dimethoxyphenyl)phosphanyl)furan-2-carboxamide (150 mg, 0.36 mmol) in 3 mL of toluene was then added slowly to the orange solution. The resultant solution was dark red/brown in color. The solution was stirred for 60 min at 50° C., after which time $^{31}$P NMR spectroscopy showed complete conversion to the desired complex. The reaction mixture was cooled to room temperature, and filtered through a plug of Celite. All volatiles were then removed from the filtrate under vacuum, leaving a yellow solid on the walls of the vial. Pentane was added, and the solution was stirred vigorously for 30 min. The yellow solid was isolated by filtration, and dried under vacuum. (164 mg, 0.26 mmol, 71% yield).

$^1$H NMR (400 MHz, Benzene-d$_6$) δ 9.05 (dd, J=4.8, 1.7 Hz, 2H), 7.13 (s, 1H), 6.86-6.79 (m, 1H), 6.59-6.52 (m, 3H), 6.35 (dd, J=8.3, 3.7 Hz, 6H), 6.16 (dd, J=8.3, 3.2 Hz, 1H), 5.99 (dd, J=3.3, 1.7 Hz, 1H), 3.39 (s, 15H), −0.12 (s, 10H), −0.49 (d, J=8.7 Hz, 2H) ppm. $^{13}$C NMR (126 MHz, Benzene-d$_6$) δ 170.17 (d, J=4.1 Hz), 161.52 (d, J=2.0 Hz), 152.40 (d, J=24.6 Hz), 150.92, 142.36, 135.96, 130.18, 123.40 (d, J=1.9 Hz), 114.05 (d, J=57.6 Hz), 112.69, 110.75, 104.79 (d, J=4.4 Hz), 55.52, 2.07, −17.01 (d, J=28.4 Hz) ppm. $^{31}$P NMR (162 MHz, Benzene-d$_6$) δ 55.22 ppm.

Example 12—Synthesis of Comparative Procatalyst C1

((Z)-N-(diphenylphosphanyl)benzimidate)(pyridine) ((trimethylsilyl)methyl)nickel(II)

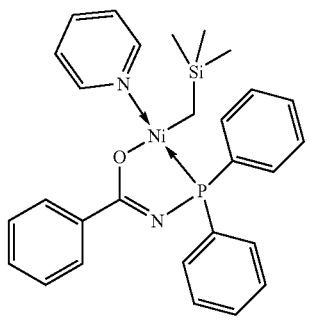

In a glove box, a 20-mL vial was charged with bis ((trimethylsilyl)methyl)bis(pyridine)nickel(II) (134 mg, 0.34 mmol, 1.05 eq), a stir bar, and 2 of mL of toluene. Pyridine (26 μL, 0.33 mmol, 1.0 eq) was added to the orange solution, followed by the slow addition of a solution of N-(diphenylphosphanyl)benzamide (100 mg, 0.33 mmol) in 3 mL of toluene. The resulting solution was dark red and clear. The solution was stirred at room temperature for 30 min, after which time $^{31}$P NMR spectroscopy showed the presence of both the desired complex (shown above) and a related nickel complex bearing a neutral ligand and two —CH$_2$SiMe$_3$ substituents. The solution was stirred at 45° C. for 60 min, after which time the $^{31}$P NMR spectrum showed complete conversion to the desired complex. The reaction mixture was filtered through a plug of Celite and all volatiles were removed under vacuum from the filtrate. The resultant crude product was dissolved in a minimal amount of toluene and the product was triturated with pentane. The product was isolated by filtration as an orange powder and the structure was confirmed by NMR spectroscopy (106 mg, 0.21 mmol, 61% yield).

$^1$H NMR (500 MHz, Benzene-d$_6$) δ 9.07 (td, J=3.3, 1.6 Hz, 2H), 8.99-8.95 (m, 2H), 8.62-8.52 (m, 4H), 7.67-7.47 (m, 10H), 7.20 (t, J=7.7 Hz, 1H), 6.95-6.83 (m, 2H), 0.21 (s, 9H), −0.15 (d, J=7.3 Hz, 2H) ppm. $^{13}$C NMR (126 MHz, Benzene-d$_6$) δ 180.63, 150.45, 136.55, 136.30, 135.85, 135.78, 135.65, 132.94, 132.86, 130.35, 130.23, 129.81 (d, J=2.5 Hz), 123.67, 1.97, −10.50 (d, J=28.8 Hz) ppm. $^{31}$P NMR (162 MHz, Benzene-d$_6$) δ 75.96 ppm.

Example 13—Ethylene/tert-Butyl Acrylate Copolymerization—Parallel Pressure Reactor Studies Catalyst activity (in terms of quench time and polymer yield) and resulting polymer characteristics were assessed for Procatalysts 1 to 5 and Comparative Procatalyst C1 (Comp. C1). Comp. C1 contains a ligand previously described. (See. *J. Organomet. Chem.* 1983, 249, C38.). The polymerization reactions were carried out in a parallel pressure reactor (PPR), as previously described.

The results tabulated in Table 1 were obtained through a polymerization reaction in the parallel polymerization reactor (PPR). For each polymerization reaction listed in Table 1, a stock solution of catalyst was prepared (1-2 mM) in toluene and immediately delivered to the PPR reactor. Copolymerization experiments were run at 400 psi ethylene pressure with 0.25-0.75 μmol catalyst loading. Tert-butyl acrylate was purified by filtering through a column of activated alumina and a solution was subsequently prepared in toluene. Reactor temperature and tert-butyl acrylate loadings were varied as shown in Table 1. Each entry in Table 1 represents the average of at least 2 replicate runs.

Comparative Procatalyst C1

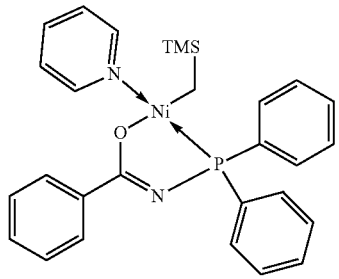

TABLE 1

Comparison of performance of Phosphine-amide catalysts (new invention) with Comparative Procatalyst C1 (Comp. C1)

| Entry | Catalyst (μmol) | Acrylate Loading (μmol) | Reactor Temp (° C.) | Activity (kg/mol · h) | Mw | PDI | Tm (° C.) | % Mol t-BA | Wt % t-BA |
|---|---|---|---|---|---|---|---|---|---|
| 1* | Comp. C1 (0.75) | 250 | 90 | 37 | 4,700 | 5.85 | 117 | N/A | N/A |
| 2 | Procat. 2 (0.25) | 250 | 90 | 620 | 21,500 | 2.37 | 121 | 1.1 | 5.0 |
| 3 | Procat. 1 (0.25) | 250 | 90 | 1400 | 124,000 | 2.29 | 124 | 0.4 | 1.7 |
| 5 | Procat. 4 (0.25) | 250 | 90 | 110 | 23,800 | 2.29 | 117 | 1.5 | 6.5 |

TABLE 1-continued

Comparison of performance of Phosphine-amide catalysts (new invention) with Comparative Procatalyst C1 (Comp. C1)

| Entry | Catalyst (µmol) | Acrylate Loading (µmol) | Reactor Temp (° C.) | Activity (kg/mol · h) | Mw | PDI | Tm (° C.) | % Mol t-BA | Wt % t-BA |
|---|---|---|---|---|---|---|---|---|---|
| 6 | Procat. 5 (0.25) | 250 | 90 | 120 | 23,100 | 2.48 | 118 | 1.3 | 5.8 |
| 7 | Procat. 3 (0.25) | 250 | 90 | 200 | 21,700 | 2.42 | 117 | 1.3 | 5.7 |
| 8* | Comp. C1 (0.75) | 750 | 100 | 17 | N/A | N/A | N/A | N/A | N/A |
| 9 | Procat. 1 (0.25) | 750 | 100 | 210 | 49,700 | 2.15 | 116 | 1.4 | 6.2 |
| 10 | Procat. 4 (0.75) | 750 | 90 | 73 | 10,700 | 2.17 | 97 | 4.9 | 19 |
| 11 | Procat. 5 (0.75) | 750 | 90 | 73 | 9,500 | 2.20 | 103 | 4.4 | 16 |
| 12 | Procat. 3 (0.75) | 750 | 100 | 82 | 8,700 | 2.22 | 85 | 3.7 | 15 |
| 13* | Comp C1 (0.75) | 1000 | 100 | 14 | N/A | N/A | N/A | N/A | N/A |
| 14 | Procat. 1 (0.25) | 1000 | 100 | 130 | 40,700 | 2.24 | 112 | 2.2 | 9.4 |
| 15 | Procat. 2 (0.75) | 1000 | 90 | 91 | 9,000 | 2.15 | 100 | 4.5 | 18 |
| 16 | Procat. 4 (0.75) | 1000 | 90 | 58 | 8,590 | 1.93 | 90 | 6.1 | 23 |
| 17 | Procat. 5 (0.75) | 1000 | 90 | 54 | 7,230 | 2.35 | 99 | 5.7 | 21 |
| 18 | Procat. 3 (0.75) | 1000 | 100 | 73 | 6,760 | 2.29 | 87 | 5.2 | 20 |

*Did not produce enough polymer to characterize in these categories.
Acrylate = Tert-butyl acylate.

The entries in Table 1 are primarily organized by acrylate loading although the temperature for certain runs may vary. The performance of the catalysts described in this disclosure are compared to Comp. C1.

As evidenced by the foregoing data, the procatalysts of this disclosure have greater activity than procatalyst Comp. C1. Furthermore, the polymers produced by Procatalysts 1 to 5 have an increased incorporation of tert-butyl acrylate and higher molecular weight compared to the polymers produced by Comp. C1. Additionally, Procatalysts 1 to 5 produce a polymer with a narrower PDI than that of the polymer produced by Comp. C1.

Without intent to be bound by theory, it is believed that the sterically hindered phosphine may be a driving factor for catalyst performance. The sterically hindered phosphine is a common component of Procatalysts 1 to 5 that is lacking in Comp. C1. For example, in entry 1, Comp. C1 exhibited very low activity (36 kg/mol h) and a broad PDI (5.85). In that instance, the activity for Comp. C1 was too low to obtain enough polymer to analyze for acrylate incorporation.

By including more sterically hindered phosphine aryl substituents, such as 2,6-dimethoxyphenyl, for example, the activity of the catalyst is boosted by an order of magnitude (entries 2-7) compared to Comp. C1 (entry 1). Therefore, not all Ni(II) phosphine amide complexes are active ethylene/acrylate copolymerization catalysts and the structural modifications we have made to the ligand constitute an invention.

Example 14—Ethylene/n-Butyl Acrylate Copolymerization—Parallel Pressure Reactor Studies The results tabulated in Table 2 were obtained through a polymerization reaction in the parallel polymerization reactor (PPR). For each polymerization reaction listed in Table 2, a stock solution of catalyst was prepared (1-2 mM) in toluene and immediately delivered to the PPR reactor. Copolymerization experiments were run at 400 psi ethylene pressure with 0.25-0.75 µmol catalyst loading. n-Butyl acrylate was purified by filtering through a column of activated alumina and a solution was subsequently prepared in toluene. Reactor temperature and n-butyl acrylate loadings were varied as shown in Table 2. Each entry in Table 2 represents the average of at least 2 replicate runs.

TABLE 2

Ethylene/n-Butyl Acrylate Copolymerization with Procatalyst 1 and 2 (new invention).

| Entry | Catalyst (µmol) | Acrylate Loading (µmol) | Reactor Temp (° C.) | Activity (kg/mol · h) | Mw | PDI | Tm (° C.) | % Mol n-BA | Wt % n-BA |
|---|---|---|---|---|---|---|---|---|---|
| 1 | Procat. 1 (0.25) | 125 | 90 | 3,110 | 107,000 | 2.16 | 126 | 0.6 | 2.6 |
| 2 | Procat. 1 (0.25) | 187 | 90 | 1,600 | 90,700 | 2.22 | 122 | 0.7 | 3.2 |

TABLE 2-continued

Ethylene/n-Butyl Acrylate Copolymerization with Procatalyst 1 and 2 (new invention).

| Entry | Catalyst (μmol) | Acrylate Loading (μmol) | Reactor Temp (° C.) | Activity (kg/mol · h) | Mw | PDI | Tm (° C.) | % Mol n-BA | Wt % n-BA |
|---|---|---|---|---|---|---|---|---|---|
| 3 | Procat. 1 (0.25) | 250 | 90 | 700 | 81,600 | 2.14 | 120 | 0.9 | 4.0 |
| 5 | Procat. 1 (0.25) | 500 | 90 | 160 | 51,500 | 2.28 | 113 | 1.9 | 8.0 |
| 6 | Procat. 2 (0.25) | 125 | 90 | 280 | 22,400 | 2.29 | 121 | 0.9 | 4.1 |
| 7 | Procat. 2 (0.25) | 187 | 90 | 170 | 18,600 | 2.42 | 117 | 1.4 | 6.1 |
| 8 | Procat 2 (0.25) | 250 | 110 | 100 | 10,100 | 2.27 | 111 | 1.7 | 7.5 |

Acrylate = n-butyl acylate.

The entries in Table 2 are primarily organized by acrylate loading although the temperature for certain runs may vary.

The relative trends in reactivity for tert-butyl acrylate copolymerization (Table 1) are observed for n-butyl acrylate (Table 2). Catalyst activity and the resulting copolymer molecular weight are inversely related to acrylate loading, whereas incorporation in directly related to acrylate loading.

It should be noted that, under identical acrylate loadings higher acrylate incorporation into the copolymer are observed for n-butyl acrylate versus tert-butyl acrylate. For example, Procat. 1 with 250 μmol n-butyl acrylate produces a polymer with 0.9 mol % acrylate incorporation (entry 3, Table 2), whereas under the same conditions, but with 250 μmol tert-butyl acrylate 0.4 mol % incorporation is observed. This class of catalyst effectively incorporates both sterically hindered and non-sterically hindered polar comonomers.

Example 15—Results Obtained by 2-L Batch Reactor

In these experiments, catalysts were introduced into the reactor as toluene solutions of the isolated metal complexes. Copolymerization experiments were run at 400 psi ethylene pressure. Reactor temperature and tert-butyl acrylate loading were varied as shown in Table 2. The initial charge of toluene to the reactor was 640 g (740 mL). The ethylene/tert-butyl acrylate copolymerization reactions were run for 75 minutes or until 40 g of ethylene uptake occurred, whichever was shorter.

TABLE 2

Performance of catalysts Procatalyst 1 and Procatalyst 2 in a 2-L batch reactor at 400 psi ethylene

| Entry | Catalyst | Cat. (μmol) | Acrylate (mmol) | Reactor Temp (° C.) | Activity (kg/mol · h) | Mw | PDI | Tm (° C.) | % Mol t-BA | Yield (g) |
|---|---|---|---|---|---|---|---|---|---|---|
| 1 | Procat. 1 | 60 | 74 | 110 | 2,100 | 53,500 | 2.22 | 120 | 1.0 | 45.8 |
| 2 | Procat. 1 | 60 | 74 | 90 | 1,500 | 90,400 | 2.16 | 119 | 1.7 | 43.0 |
| 3 | Procat. 1 | 60 | 222 | 90 | 440 | 47,100 | 2.35 | 110 | 2.6 | 32.4 |
| 4 | Procat. 1 | 178 | 222 | 110 | 920 | 26,700 | 2.15 | 111 | 2.9 | 51.4 |
| 5 | Procat. 2 | 178 | 74 | 90 | 660 | 17,800 | 2.30 | 117 | 1.4 | 47.0 |
| 6 | Procat. 2 | 178 | 74 | 110 | 170 | 11,300 | 2.51 | 114 | 2.2 | 36.6 |
| 7 | Procat. 2 | 178 | 222 | 110 | 59 | 4,700 | 2.27 | 88 | 4.1 | 13.2 |
| 8 | Procat. 2 | 178 | 222 | 90 | 140 | 7,500 | 2.52 | 97 | 5.1 | 30.5 |

As shown by the results tabulated in Table 2, the procatalysts of this disclosure, specifically Procatalysts 1 and 2, are capable of catalyzing ethylene/tert-butyl acrylate copolymerization reactions in a 2-L batch reactor to yield ethylene/tert-butyl acrylate copolymer on a multigram scale. Higher activities for the catalysts were observed in the batch reactor compared to the PPR reactors, accompanied by higher levels of acrylate incorporation. Up to 50 g of polymer was produced per run. In particular Procatalyst 1 performed well (see entry 2), producing high MW polymer (90,400) with significant acrylate incorporation (1.7 mol %) at high activity (1,500 kg/mol·h).

The invention claimed is:

1. A procatalyst according to formula (I):

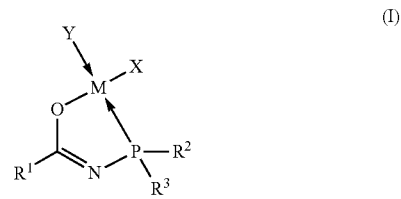

(I)

where:

M is nickel (II) or palladium (II);

X is a ligand chosen from $(C_1\text{-}C_{40})$ hydrocarbyl, $(C_1\text{-}C_{40})$ heterohydrocarbyl, —H, —$CH_2Si(R^C)_{3-Q}(OR^C)_Q$, —$Si(R^C)_{3-Q}(OR^C)_Q$, —$OSi(R^C)_{3-Q}(OR^C)_Q$, —$Ge(R^C)_{3-Q}(OR^C)_Q$, —$P(R^C)_{2-W}(OR^C)_W$, —$P(O)(R^C)_{2-W}(OR^C)_W$, —$N(R^C)_2$, —$N(Si(R^C)_3)_2$, —$NR^CSi(R^C)_3$, —$OR^C$, —$SR^C$, —$NO_2$, —$CN$, —$CF_3$, —$OCF_3$, —$S(O)R^C$, —$S(O)_2R^C$, —$OS(O)_2R^C$, —$N=C(R^C)_2$, —$N=CH(R^C)$, —$N=CH_2$, —$N=P(R^C)_3$, —$OC(O)R^C$, —$C(O)OR^C$, —$C(O)R^C$, —$C(O)H$, —$N(R^C)C(O)$ $R^C$, —N($R^C$)C(O)H, —NHC(O)$R^C$, —NHC(O)H, —C(O)N($R^C$)$_2$, —C(O)NH$R^C$, —C(O)NH$_2$, or a halogen, wherein each $R^C$ is independently (C$_1$-C$_{30}$) hydrocarbyl optionally substituted with one or more $R^S$ or (C$_1$-C$_{30}$) heterohydrocarbyl optionally substituted with one or more $R^S$, wherein subscript Q is 0, 1, 2, or 3, and wherein subscript W is 0, 1, or 2;

Y is a Lewis base;

optionally, Y and X are covalently connected;

$R^1$ is chosen from unsubstituted (C$_6$-C$_{40}$) aryl, substituted (C$_6$-C$_{40}$) aryl, unsubstituted (C$_1$-C$_{40}$) heteroaryl having its radical on a carbon atom, substituted (C$_1$-C$_{40}$) heteroaryl having its radical on a carbon atom, or substituted (C$_4$-C$_{20}$)alkyl having at least one tertiary carbon atom and its radical on the tertiary carbon atom of the (C$_4$-C$_{20}$)alkyl, provided that:

$R^2$ and $R^3$ are independently selected from radicals having formula (II):

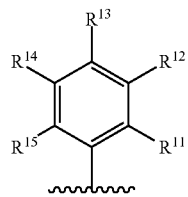

(II)

where:

each $R^{11}$, $R^{12}$, $R^{13}$, $R^{14}$, and $R^{15}$ are independently, (C$_1$-C$_{30}$) hydrocarbyl, (C$_1$-C$_{30}$) heterohydrocarbyl, —O$R^N$, —N$R^N_2$, —SRN, halogen, or —H, where $R^N$ is (C$_1$-C$_{30}$) hydrocarbyl;

provided that at least one of $R^{11}$ and $R^{15}$ is not-H; and each $R^S$ in formula (I) is independently (C$_1$-C$_{20}$) hydrocarbyl or halogen.

2. The procatalyst according to claim 1, wherein Y is a neutral Lewis basic aprotic (C$_2$-C$_{40}$) heterohydrocarbon.

3. The procatalyst according to claim 1, wherein $R^2$ and $R^3$ are identical.

4. The procatalyst according to claim 3, wherein $R^{11}$ and $R^{15}$ are independently-O [(C$_1$-C$_{10}$)alkyl].

5. The procatalyst according to claim 3, wherein $R^{11}$ and $R^{15}$ are methoxy.

6. The procatalyst according to claim 3, wherein $R^{11}$ and $R^{15}$ are ethoxy.

7. The procatalyst according to claim 3, wherein $R^{11}$ and $R^{15}$ are independently —N[(C$_1$-C$_{10}$)alkyl]$_2$.

8. The procatalyst according to claim 1, wherein $R^1$ is a radical having formula (III):

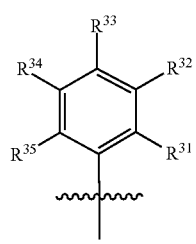

(III)

where $R^{31-35}$ is independently chosen from —H, (C$_1$-C$_{40}$) hydrocarbyl, (C$_1$-C$_{40}$) heterohydrocarbyl, —Si(RR)$_3$, —Ge(RR)$_3$, —P(RR)$_2$, —P(O)(RR)$_2$, —N($R^R$)$_2$, —O$R^R$, —S$R^R$, —NO$_2$, —CN, —CF$_3$, or halogen, where each $R^R$ is (C$_1$-C$_{30}$) hydrocarbyl, (C$_1$-C$_{30}$) heterohydrocarbyl, or —H.

9. The procatalyst according to claim 8, wherein $R^{32}$, $R^{33}$, and $R^{34}$ are independently chosen from (C$_1$-C$_{40}$)heterohydrocarbyl, —Si[(C$_1$-C$_{10}$)alkyl]$_3$, —N[(C$_1$-C$_{10}$)alkyl]$_2$, —O[(C$_1$-C$_{10}$)alkyl].

10. The procatalyst according to claim 8, wherein $R^{32}$, $R^{33}$, and $R^{34}$ are independently chosen from methoxy or ethoxy.

11. The procatalyst according to claim 8, wherein $R^{32}$ and $R^{34}$ are —CF$_3$.

12. The procatalyst according to claim 1, where $R^1$ is 2-furyl.

13. The procatalyst according to claim 1, wherein X is —CH$_2$Si(CH$_3$)$_3$, —(CH$_2$)Si(CH$_3$)$_2$(C$_6$H$_5$), —(CH$_2$)Si(CH$_3$)(C$_6$H$_5$)$_2$, —(CH$_2$)Si(C$_6$H$_5$)$_3$, or (CH$_2$)Si(CH$_3$)$_2$(CH$_2$C$_6$H$_5$).

14. A polymerization process comprising polymerizing ethylene and optionally one or more (C$_3$-C$_{10}$)α-olefin monomers or optionally one or more cyclic olefin monomers in the presence of a catalyst system comprising a metal-ligand complex procatalyst according to claim 1.

15. A polymerization process comprising polymerizing ethylene, a polar comonomer, and optionally one or more (C$_3$-C$_{10}$)α-olefin monomers or optionally one or more cyclic olefin monomers in the presence of a catalyst system comprising a metal-ligand complex procatalyst according to claim 1.

16. The polymerization process according to claim 15, wherein the polar comonomer is chosen from acrylate (CH$_2$=CHC(O)(OR)), glycidyl acrylate, CH$_2$=CH(CH$_2$)$_n$C(O)(OR), CH$_2$=CHC(O)R, CH$_2$—CH(CH$_2$)$_n$C(O)R, CH$_2$—CH—OC(O)R, CH$_2$=CH(CH$_2$)$_n$—OC(O)R, CH$_2$—CH(OR), CH$_2$=CH(CH$_2$)$_n$(OR), CH$_2$=CHSi(R)$_{3-T}$(OR)$_T$, CH$_2$=CH(CH$_2$)$_n$Si(R)$_{3-T}$(OR)$_T$, CH$_2$—CH—OSi(R)$_{3-T}$(OR)$_T$, CH$_2$=CH(CH$_2$)$_n$—OSi(R)$_{3-T}$(OR)$_T$ or CH$_2$—CHCl, where R is chosen from —H, a substituted or unsubstituted (C$_1$-C$_{30}$) hydrocarbyl, or a substituted or unsubstituted (C$_1$-C$_{30}$) heterohydrocarbyl, n is an integer from 1 to 10, and where T is 0, 1, 2, or 3.

17. The polymerization process according to claim 15, wherein the acrylate comonomer is tert-butyl acrylate.

18. The polymerization process according to claim 15, wherein the acrylate comonomer is n-butyl acrylate.

* * * * *